(12) United States Patent
Nakagawa et al.

(10) Patent No.: US 8,466,227 B2
(45) Date of Patent: Jun. 18, 2013

(54) CROSSLINKED FLUORINE-CONTAINING ELASTOMER FINE PARTICLES, PREPARATION PROCESS OF SAME, AND COMPOSITION

(75) Inventors: Hideto Nakagawa, Settsu (JP); Haruhiko Mohri, Settsu (JP); Hirokazu Aoyama, Settsu (JP); Junpei Terada, Settsu (JP); Rumi Takeuchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/289,948

(22) Filed: Nov. 4, 2011

(65) Prior Publication Data

US 2012/0053297 A1    Mar. 1, 2012

Related U.S. Application Data

(62) Division of application No. 12/599,912, filed as application No. PCT/JP2008/058404 on May 2, 2008, now abandoned.

(30) Foreign Application Priority Data

May 16, 2007   (JP) ................................ 2007-130758
Nov. 22, 2007  (JP) ................................ 2007-303397

(51) Int. Cl.
*B32B 5/16*    (2006.01)
*C08L 27/10*   (2006.01)
*C08L 27/12*   (2006.01)

(52) U.S. Cl.
USPC ............ 524/544; 428/402; 524/551; 524/567

(58) Field of Classification Search
CPC .................................. C08L 27/10; C08L 27/12
USPC ......................... 524/544, 551, 567; 428/402
See application file for complete search history.

(56) References Cited

U.S. PATENT DOCUMENTS

| 4,299,958 | A | 11/1981 | Apotheker | |
| 4,303,761 | A * | 12/1981 | Apotheker | 525/200 |
| 4,320,216 | A | 3/1982 | Apotheker | |
| 4,857,598 | A | 8/1989 | Moggi et al. | |
| 6,682,127 | B2 * | 1/2004 | Jones et al. | 296/187.03 |
| 6,683,127 | B1 * | 1/2004 | Tanaka et al. | 524/496 |
| 2006/0293432 | A1 * | 12/2006 | Hirano et al. | 524/493 |
| 2007/0027259 | A1 | 2/2007 | Yoshida | |
| 2010/0247913 | A1 * | 9/2010 | Nakagawa et al. | 428/402 |

FOREIGN PATENT DOCUMENTS

| CA | 1130035 | 8/1982 |
| CN | 86 1 05709 A | 4/1987 |
| EP | 0 166 020 A | 1/1986 |
| GB | 2052494 A | 1/1981 |
| JP | 56-26970 A | 3/1981 |
| JP | 61-57641 A | 3/1986 |
| JP | 06-248146 A | 9/1994 |
| JP | 08-059941 A | 3/1996 |
| JP | 2005-002148 A | 1/2005 |

* cited by examiner

*Primary Examiner* — Hoa (Holly) Le
(74) *Attorney, Agent, or Firm* — Sughrue Mion, PLLC

(57) ABSTRACT

There are provided novel crosslinked fluorine-containing elastomer fine particles, a process for preparing crosslinked fluorine-containing elastomer fine particles and a resin composition comprising the same. The crosslinked fluorine-containing elastomer fine particles are crosslinked fluorine-containing elastomer fine particles having a gel fraction of not less than 85% by mass or crosslinked fluorine-containing elastomer fine particles obtained by crosslinking fluorine-containing elastomer particles having at least three iodine atoms per one polymer molecule at an end thereof. The composition is one comprising those fine particles and a synthetic resin. The preparation process is a process for preparing crosslinked fluorine-containing elastomer fine particles, characterized by subjecting peroxide-crosslinkable fluorine-containing elastomer particles to peroxide-crosslinking by heating an aqueous dispersion comprising the fluorine-containing elastomer particles, a peroxide and a polyfunctional unsaturated compound.

6 Claims, No Drawings

CROSSLINKED FLUORINE-CONTAINING ELASTOMER FINE PARTICLES, PREPARATION PROCESS OF SAME, AND COMPOSITION

CROSS-REFERENCE TO RELATED APPLICATIONS

This is a Rule 53(b) Divisional of application Ser. No. 12/599,912 filed Nov. 12, 2009, which is a 371 of PCT Application No. PCT/JP2008/058404 filed May 2, 2008, and which claims benefit to Japanese Patent Application No. 2007-130758 filed May 16, 2007 and Japanese Patent Application No. 2007-303397 filed Nov. 22, 2007. The above-noted applications are incorporated herein by reference in their entirety.

TECHNICAL FIELD

The present invention relates to novel crosslinked fluorine-containing elastomer fine particles, a composition comprising the crosslinked fluorine-containing elastomer fine particles and a synthetic resin, and a novel process for preparing crosslinked fluorine-containing elastomer fine particles by peroxide-crosslinking fluorine-containing elastomer particles in an aqueous dispersion.

BACKGROUND ART

Fine particles of crosslinked fluorine-containing elastomer (hereinafter also referred to as "crosslinked fluorine-containing elastomer fine particles") are used for the purpose of imparting flexibility, etc., for example, to various synthetic resins, especially thermoplastic fluorine-containing resins.

For preparing such crosslinked fluorine-containing elastomer fine particles, there are known (1) a method of pulverizing crosslinked fluorine-containing elastomer particles, (2) a method of preparing fluorine-containing elastomer fine particles by emulsion polymerization in the presence of a monomer having two or more ethylenically unsaturated groups as a copolymerizable component, thereby simultaneously crosslinking with the advance of the polymerization, and (3) a method of impregnating fluorine-containing elastomer fine particles prepared by emulsion polymerization with a vulcanizing agent and a vulcanization aid and then vulcanizing the fine particles in the form of latex (JP6-248146A and JP8-59941A).

However, in the case of the finely pulverizing method (1), there is a problem that a particle size of the crosslinked fluorine-containing elastomer particles becomes large.

Also in the method (2) of carrying out crosslinking simultaneously during polymerization, there is a problem that since polymerization reaction is inhibited by crosslinking reaction, a molecular weight is not increased and sufficient strength is not obtained.

Further, with respect to the method (3) of vulcanizing emulsified polymer particles in the form of latex, JP6-248146A and JP8-59941A do not disclose concrete means for vulcanizing emulsified polymer particles in the form of latex. It is only the method (2) of carrying out crosslinking simultaneously during polymerization that is concretely disclosed in JP6-248146A and JP8-59941A.

DISCLOSURE OF INVENTION

It is an object of the present invention to provide novel crosslinked fluorine-containing elastomer fine particles, a composition comprising the crosslinked fluorine-containing elastomer fine particles and a synthetic resin, and a novel process for preparing crosslinked fluorine-containing elastomer fine particles by peroxide-crosslinking of fluorine-containing elastomer particles in an aqueous dispersion.

Namely, the present invention relates to a composition comprising crosslinked fluorine-containing elastomer fine particles (D1) having a gel fraction of not less than 85% by mass and a synthetic resin (E) and having a mass ratio of the crosslinked fluorine-containing elastomer fine particles (D1) to the synthetic resin (E) of 0.1/99.9 to 25/75 (the first invention).

It is preferable that a fluorine content of fluorine-containing elastomer (a1) constituting the above-mentioned crosslinked fluorine-containing elastomer fine particles (D1) is not less than 65% by mass.

It is preferable that the fluorine-containing elastomer (a1) constituting the above-mentioned crosslinked fluorine-containing elastomer fine particles (D1) comprises a structural unit derived from at least one monomer selected from the group consisting of tetrafluoroethylene, vinylidene fluoride and a perfluoro ethylenically unsaturated compound represented by the formula (1):

$$CF_2=CF-R_f^1 \tag{1}$$

wherein $R_f^1$ is $-CF_3$ or $-OR_f^2$, where $R_f^2$ is a perfluoroalkyl group having 1 to 5 carbon atoms.

It is preferable that an average particle size of the above-mentioned crosslinked fluorine-containing elastomer fine particles (D1) is from 0.3 to 0.1 µm.

A preferred example of the synthetic resin (E) is a tetrafluoroethylene-hexafluoropropylene copolymer.

The present invention also relates to crosslinked fluorine-containing elastomer fine particles (D2) obtained by crosslinking particles (A2) of a fluorine-containing elastomer (a2) having at least three iodine atoms per one polymer molecule at an end thereof (the second invention).

It is preferable that a fluorine content of the fluorine-containing elastomer (a2) constituting the above-mentioned crosslinked fluorine-containing elastomer fine particles (D2) is not less than 65% by mass.

It is preferable that the fluorine-containing elastomer (a2) constituting the above-mentioned crosslinked fluorine-containing elastomer fine particles (D2) comprises a structural unit derived from at least one monomer selected from the group consisting of tetrafluoroethylene, vinylidene fluoride and a perfluoro ethylenically unsaturated compound represented by the formula (1):

$$CF_2=CF-R_f^1 \tag{1}$$

wherein $R_f^1$ is $-CF_3$ or $-OR_f^2$, where $R_f^2$ is a perfluoroalkyl group having 1 to 5 carbon atoms.

It is preferable that an average particle size of the above-mentioned crosslinked fluorine-containing elastomer fine particles (D2) is from 0.3 to 0.1 µm.

The present invention also relates to a composition comprising the above-mentioned crosslinked fluorine-containing elastomer fine particles (D2) and a synthetic resin (E) (the third invention).

A preferred example of the synthetic resin (E) is a tetrafluoroethylene-hexafluoropropylene copolymer.

The present invention further relates to crosslinked fluorine-containing elastomer fine particles (D3) obtained by crosslinking particles (A3) of a fluorine-containing elastomer (a3) comprising a structural unit derived from an ethylenically unsaturated monomer comprising at least one fluoroolefin and a structural unit derived from a monomer represented by the formula (3c):

$$CY^1_2=CY^2R_f^1X^1 \quad (3c)$$

wherein $Y^1$ and $Y^2$ are fluorine atom, hydrogen atom or —$CH_3$; $R_f^1$ is a linear or branched fluoroalkylene or perfluoroalkylene group which may have an ether linkage-formable oxygen atom; $X^1$ is iodine atom or bromine atom (the fourth invention).

It is preferable that a fluorine content of fluorine-containing elastomer (a3) constituting the above-mentioned crosslinked fluorine-containing elastomer fine particles (D3) is not less than 65% by mass.

It is preferable that the fluorine-containing elastomer (a3) constituting the above-mentioned crosslinked fluorine-containing elastomer fine particles (D3) comprises a structural unit derived from at least one monomer selected from the group consisting of tetrafluoroethylene, vinylidene fluoride and a perfluoro ethylenically unsaturated compound represented by the formula (1):

$$CF_2=CF-R_f^1 \quad (1)$$

wherein $R_f^1$ is —$CF_3$ or —$OR_f^2$, where $R_f^2$ is a perfluoroalkyl group having 1 to 5 carbon atoms.

It is preferable that an average particle size of the above-mentioned crosslinked fluorine-containing elastomer fine particles (D3) is from 0.3 to 0.1 μm.

The present invention further relates to a composition comprising the above-mentioned crosslinked fluorine-containing elastomer fine particles (D3) and a synthetic resin (E) (the fifth invention).

A preferred example of the synthetic resin (E) is a tetrafluoroethylene-hexafluoropropylene copolymer.

The present invention further relates to a process for preparing crosslinked fluorine-containing elastomer fine particles (D4) characterized by subjecting peroxide-crosslinkable fluorine-containing elastomer particles (A4) to peroxide-crosslinking by heating an aqueous dispersion comprising the fluorine-containing elastomer particles (A4), a peroxide (B) and a polyfunctional unsaturated compound (C) (the sixth invention).

The peroxide (B) to be preferably used is a persulfate and/or organic peroxide.

For example, at least one compound selected from the group consisting of an oxime-nitroso compound, a di(meth)acrylate compound, a triester compound, a triallyl isocyanurate compound and a polybutadiene compound is suitably used as the polyfunctional unsaturated compound (C).

It is preferable that an average particle size of the fluorine-containing elastomer particles (A4) in the aqueous dispersion is from 0.01 to 0.5 μm.

Also, it is preferable that a fluorine content of fluorine-containing elastomer (a4) constituting the fluorine-containing elastomer particles (A4) is not less than 65% by mass.

A preferred example of the fluorine-containing elastomer (a4) constituting the fluorine-containing elastomer particles (A4) is one comprising a structural unit derived from at least one monomer selected from the group consisting of tetrafluoroethylene, vinylidene fluoride and a perfluoro ethylenically unsaturated compound represented by the formula (1):

$$CF_2=CF-R_f^1 \quad (1)$$

wherein $R_f^1$ is —$CF_3$ or —$OR_f^2$, where $R_f^2$ is a perfluoroalkyl group having 1 to 5 carbon atoms.

A preferred method of recovering the crosslinked fluorine-containing elastomer fine particles (D4) after the peroxide-crosslinking is a freeze-coagulation method.

The present invention further relates to the peroxide-crosslinked fluorine-containing elastomer fine particles (D4) obtained by the above-mentioned preparation process (the seventh invention).

It is preferable that an average particle size of the crosslinked fluorine-containing elastomer fine particles is from 0.01 to 0.5 μm.

It is preferable that a fluorine content of the crosslinked fluorine-containing elastomer fine particles is not less than 65% by mass.

It is preferable that an amount of the crosslinked fluorine-containing elastomer fine particles being insoluble in acetone is not less than 80% by mass.

BEST MODE FOR CARRYING OUT THE INVENTION

The first invention of the present invention relates to the composition comprising the crosslinked fluorine-containing elastomer fine particles (D1) having a gel fraction of not less than 85% by mass and the synthetic resin (E) and having a mass ratio of the crosslinked fluorine-containing elastomer fine particles (D1) to the synthetic resin (E) of 0.1/99.9 to 25/75.

Here, the gel fraction means a mass percentage (%) of a crosslinked fluorine-containing elastomer being insoluble in a certain solvent in which a fluorine-containing elastomer is soluble but a crosslinked fluorine-containing elastomer is not soluble. Specifically it is preferable that when a crosslinked fluorine-containing elastomer is one obtained by crosslinking a non-perfluoroelastomer, the gel fraction is a mass percentage (%) of a portion being insoluble in acetone, and when a crosslinked fluorine-containing elastomer is one obtained by crosslinking a perfluoroelastomer, the gel fraction is a mass percentage (%) of a portion being insoluble in hexane.

When the gel fraction of the crosslinked fluorine-containing elastomer fine particles (D1) is not less than 85% by mass, an amount of an un-crosslinked portion is small, and as a result, agglomeration of the crosslinked fluorine-containing elastomer fine particles is inhibited, thereby enabling the fine particles to be homogeneously dispersed in the synthetic resin (E), and low elastic modulus can be imparted without greatly lowering strength at break and characteristics of the synthetic resin. A preferred gel fraction is not less than 87% by mass, further preferably not less than 90% by mass. An upper limit is 100% by mass (completely gelled).

The crosslinked fluorine-containing elastomer fine particles (D1) can be obtained by crosslinking the fluorine-containing elastomer particles (A1) to give the gel fraction of not less than 85% by mass. The method of crosslinking the fluorine-containing elastomer particles (A1) to give the gel fraction of not less than 85% by mass is explained infra (for example, in the sixth invention).

A suitable example of the fluorine-containing elastomer (a1) constituting the fluorine-containing elastomer particles (A1) is a crosslinkable fluorine-containing rubber, and it is preferable that the fluorine-containing elastomer (a1) comprises a structural unit derived from at least one monomer selected from the group consisting of tetrafluoroethylene, vinylidene fluoride and a perfluoro ethylenically unsaturated compound represented by the formula (1):

$$CF_2=CF-R_f^1 \quad (1)$$

wherein $R_f^1$ is —$CF_3$ or —$OR_f^2$, where $R_f^2$ is a perfluoroalkyl group having 1 to 5 carbon atoms, from the point that particles having properties of an elastic rubber can be obtained.

Non-perfluoro fluorine-containing rubber (a1-1) and perfluoro fluorine-containing rubber (a1-2) are preferred as the fluorine-containing rubber.

Examples of the non-perfluoro fluorine-containing rubber (a1-1) are vinylidene fluoride (VdF) type fluorine-containing rubbers, tetrafluoroethylene (TFE)/propylene type fluorine-containing rubbers, tetrafluoroethylene (TFE)/propylene/vinylidene fluoride (VdF) type fluorine-containing rubbers, ethylene/hexafluoropropylene (HFP) type fluorine-containing rubbers, ethylene/hexafluoropropylene (HFP)/vinylidene fluoride (VdF) type fluorine-containing rubbers, ethylene/hexafluoropropylene (HFP)/tetrafluoroethylene (TFE) type fluorine-containing rubbers, fluorosilicone type fluorine-containing rubbers, fluorophosphazene type fluorine-containing rubbers, and the like. Those rubbers can be used alone or can be used in an optional combination thereof to such an extent not to impair the effect of the present invention. Among these, vinylidene fluoride (VdF) type fluorine-containing rubbers and tetrafluoroethylene/propylene type fluorine-containing rubbers are more suitable.

Specifically, in the above-mentioned VdF type rubbers, the amount of VdF repeat units is preferably not less than 20% by mole and not more than 90% by mole, more preferably not less than 40% by mole and not more than 85% by mole based on the total number of moles of the VdF repeat units and the repeat units derived from other comonomers in the above-mentioned VdF type elastomer. Further, a preferred lower limit is 45% by mole, especially 50% by mole, and a preferred upper limit is 80% by mole.

Other monomers in the above-mentioned VdF type rubbers are not limited particularly as far as they are copolymerizable with VdF. Examples thereof are fluorine-containing monomers such as TFE, HFP, PAVE, CTFE, trifluoroethylene, trifluoropropylene, tetrafluoropropylene, pentafluoropropylene, trifluorobutene, tetrafluoroisobutene, vinyl fluoride and iodine-containing fluorinated vinyl ether; and non-fluorine-containing monomers such as ethylene (Et), propylene (Pr) and alkyl vinyl ether. One out of these fluorine-containing monomers and non-fluorine-containing monomers can be used or two or more thereof can be used in combination. Preferred examples of the above-mentioned PAVE are perfluoro(methyl vinyl ether) and perfluoro(propyl vinyl ether), and especially perfluoro(methyl vinyl ether) is preferred.

Preferred examples of the above-mentioned VdF type rubbers are a VdF/HFP copolymer, a VdF/HFP/TFE copolymer, a VdF/CTFE copolymer, a VdF/CTFE/TFE copolymer, a VdF/PAVE copolymer, a VdF/TFE/PAVE copolymer, a VdF/HFP/PAVE copolymer, a VdF/HFP/TFE/PAVE copolymer, a VdF/TFE/Pr copolymer, and a VdF/Et/HFP copolymer, and more preferred examples are those comprising TFE, HFP and/or PAVE as other monomer, and especially preferred are a VdF/HFP copolymer, a VdF/HFP/TFE copolymer, a VdF/PAVE copolymer, a VdF/TFE/PAVE copolymer, a VdF/HFP/PAVE copolymer and a VdF/HFP/TFE/PAVE copolymer.

In the VdF/HFP copolymer, a ratio of VdF/HFP is preferably 45 to 85/55 to 15 (molar percent), more preferably 50 to 80/50 to 20 (molar percent), further preferably 60 to 80/40 to 20 (molar percent).

A preferred VdF/HFP/TFE copolymer is one comprising VdF/HFP/TFE in a ratio of 40 to 80/10 to 35/10 to 25 (molar percent).

A preferred VdF/PAVE copolymer is one comprising VdF/PAVE in a ratio of 65 to 90/10 to 35 (molar percent).

A preferred VdF/TFE/PAVE copolymer is one comprising VdF/TFE/PAVE in a ratio of 40 to 80/3 to 40/15 to 35 (molar percent).

A preferred VdF/HFP/PAVE copolymer is one comprising VdF/HFP/PAVE in a ratio of 65 to 90/3 to 25/3 to 25 (molar percent).

A preferred VdF/HFP/TFE/PAVE copolymer is one comprising VdF/HFP/TFE/PAVE in a ratio of 40 to 90/0 to 25/0 to 40/3 to 35 (molar percent), more preferably one comprising VdF/HFP/TFE/PAVE in a ratio of 40 to 80/3 to 25/3 to 40/3 to 25 (molar percent).

Tetrafluoroethylene/propylene type fluorine-containing rubbers are fluorine-containing copolymers comprising 45 to 70% by mole of tetrafluoroethylene and 55 to 30% by mole of propylene. In addition to these two components, a specific third component (for example, PAVE) may be contained in an amount of 0 to 40% by mole.

Examples of the perfluoro fluorine-containing rubber (a1-2) are ones comprising TFE/PAVE. A ratio of TFE/PAVE is preferably 50 to 90/50 to 10 in molar percent, more preferably 50 to 80/50 to 20 in molar percent, further preferably 55 to 70/45 to 30 in molar percent.

In this case, examples of the PAVE are perfluoro(methyl vinyl ether), perfluoro(propyl vinyl ether) and the like, and these can be used alone or can be used in an optional combination thereof.

Preferred examples of the fluorine-containing elastomer (a1) are peroxide-crosslinkable fluorine-containing rubbers, and specifically it is preferable that the fluorine-containing elastomer (a1) contains iodine atom and/or bromine atom (preferably iodine atom) in an amount of 0.01 to 10% by mass, more preferably 0.05 to 2% by mass. When the amount is less than 0.01% by mass, there is a tendency that crosslinking is insufficient, thereby lowering compression set, and when the amount exceeds 10% by mass, there is a tendency that crosslinking density is too high, thereby lowering rubber performance, for example, elongation becomes too small.

Examples of the fluorine-containing elastomer (a1) having iodine (bromine) atom are the above-mentioned non-perfluoro fluorine-containing rubbers (a1-1) and perfluoro fluorine-containing rubbers (a1-2), ones having a repeat unit derived from a specific iodine (bromine) atom-containing monomer (which is also called a monomer providing a peroxide-crosslinkable cure site), and ones prepared by iodine (bromine) transfer polymerization explained infra.

Examples of a specific iodine (bromine) atom-containing monomer are compounds represented by the formula (3a):

$$CY^1{}_2=CY^2R_f^1X^1 \quad (3a)$$

wherein $Y^1$ and $Y^2$ are fluorine atom, hydrogen atom or $-CH_3$; $R_f^1$ is a linear or branched fluoroalkylene or perfluoroalkylene group which may have an ether linkage-formable oxygen atom; $X^1$ is iodine atom or bromine atom, and for example, there are iodine-containing monomers and bromine-containing monomers represented by the formula (4a):

$$CY^1{}_2=CY^2R_f^3CHR^1-X^1 \quad (4a)$$

wherein $Y^1$, $Y^2$ and $X^1$ are as defined in the formula (3a), $R_f^3$ is a linear or branched fluoroalkylene group, perfluoroalkylene group, fluorooxyalkylene group, perfluorooxyalkylene group, or perfluoropolyoxyalkylene group which may have at least one ether type oxygen atom; $R^1$ is hydrogen atom or methyl group, and iodine-containing monomers and bromine-containing monomers represented by the formulas (5a) to (22a):

$$CY^4{}_2=CY^4(CF_2)_n-X^1 \quad (5a)$$

where $Y^4$ is hydrogen atom or fluorine atom, n is an integer of 1 to 8, $$CF_2=CFCF_2R_f^4-X^1 \quad (6a)$$

where $R_f^4$ is $OCF_{2n}$ or $(OCF(CF_3))_n$, n is 0 or an integer of 1 to 5, $$CF_2=CFCF_2(OCF(CF_3)CF_2)_m(OCH_2CF_2CF_2)_n OCH_2CF_2—X^1 \quad (7a)$$

where m is 0 or an integer of 1 to 5, n is 0 or an integer of 1 to 5, $$CF_2=CFCF_2(OCH_2CF_2CF_2)_m(OCF(CF_3)CF_2)_nOCF(CF_3)—X^1 \quad (8a)$$

where m is 0 or an integer of 1 to 5, n is 0 or an integer of 1 to 5, $$CF_2=CF(OCF_2CF(CF_3))_mO(CF_2)_n—X^1 \quad (9a)$$

where m is 0 or an integer of 1 to 5, n is an integer of 1 to 8, $$CF_2=CF(OCF_2CF(CF_3))_m—X^1 \quad (10a)$$

where m is an integer of 1 to 5, $$CF_2=CFOCF_2(CF(CF_3)OCF_2)_nCF(—X^1)CF_3 \quad (11a)$$

where n is an integer of 1 to 4, $$CF_2=CFO(CF_2)_nOCF(CF_3)—X^1 \quad (12a)$$

where n is an integer of 2 to 5, $$CF_2=CFO(CF_2)_n—(C_6H_4)—X^1 \quad (13a)$$

where n is an integer of 1 to 6, $$CF_2=CF(OCF_2CF(CF_3))_nOCF_2CF(CF_3)—X^1 \quad (14a)$$

where n is an integer of 1 to 2, $$CH_2=CFCF_2O(CF(CF_3)CF_2O)_nCF(CF_3)—X^1 \quad (15a)$$

where n is 0 or an integer of 1 to 5, $$CF_2=CFO(CF_2CF(CF_3)O)_m(CF_2)_n—X^1 \quad (16a)$$

where m is 0 or an integer of 1 to 5, n is an integer of 1 to 3, $$CH_2=CFCF_2OCF(CF_3)OCF(CF_3)—X^1 \quad (17a)$$

$$CH_2=CFCF_2OCH_2CF_2—X^1 \quad (18a)$$

$$CF_2=CFO(CF_2CF(CF_3)O)_mCF_2CF(CF_3)—X^1 \quad (19a)$$

where m is an integer of not less than 0, $$CF_2=CFOCF(CF_3)CF_2O(CF_2)_n—X^1 \quad (20a)$$

where n is an integer of not less than 1, $$CF_2=CFOCF_2OCF_2CF(CF_3)OCF_2—X^1 \quad (21a), and$$

$$CH_2=CH—(CF_2)_nX^1 \quad (22a)$$

where n is an integer of 2 to 8,
(in the formulas (5a) to (22a), $X^1$ is as defined in the formula (3a)), and these can be used alone or can be used in an optional combination thereof.

Preferred examples of the iodine- or bromine-containing monomer represented by the formula (4a) are iodine-containing fluorinated vinyl ethers represented by the formula (23):

$$I(CH_2CF_2CF_2O)_m(CFCF_2O)_nCF=CF_2 \quad (23)$$
with CF_3 branch where m is an integer of 1 to 5, n is 0 or an integer of 1 to 3, and specifically there are $ICH_2CF_2CF_2OCF=CF_2$,  $I(CH_2CF_2CF_2O)_2CF=CF_2$, $I(CH_2CF_2CF_2O)_3CF=CF_2$, $ICH_2CF_2CF_2OCFCF_2OCF=CF_2$ (with $CF_3$ groups), $ICH_2CF_2CF_2O(CFCF_2O)_2CF=CF_2$ (with $CF_3$ group)

and the like, and among these, $ICH_2CF_2CF_2OCF=CF_2$ is preferred.

More specifically, preferred examples of the iodine-containing monomer or bromine-containing monomer represented by the formula (5a) are $ICF_2CF_2CF=CH_2$ and $I(CF_2CF_2)_2CF=CH_2$.

More specifically, preferred example of the iodine-containing monomer or bromine-containing monomer represented by the formula (9a) is $I(CF_2CF_2)_2OCF=CF_2$.

More specifically, preferred examples of the iodine-containing monomer or bromine-containing monomer represented by the formula (22a) are $CH_2=CHCF_2CF_2I$ and $I(CF_2CF_2)_2CH=CH_2$.

Among the compounds represented by the above-mentioned formulas (4a) to (22a), monomers having $X^1$ of cyano group (—CN group), carboxyl group (—COOH group) or alkoxycarbonyl group (—COOR group, where R is an alkyl group which has 1 to 10 carbon atoms and may have fluorine atom) may be used together with the compound represented by the general formula (1).

When structural units derived from these iodine (bromine) atom-containing monomers are contained, the amount thereof is preferably not less than 2% by mole and not more than 10% by mole based on the total number of moles of such structural units and repeat units derived from other comonomers.

For iodine (bromine) transfer polymerization, for example, there is exemplified a method of carrying out emulsion polymerization of the above-mentioned monomer constituting the fluorine-containing elastomer (a1) and, if necessary, a monomer providing peroxide-crosslinkable cure site in the presence of an iodine compound, preferably a diiodine compound with stirring under pressure in the presence of a radical initiator in an aqueous medium substantially in the absence of oxygen. A representative example of the diiodine compound to be used is a compound represented by the formula (2a):

$$R^2I_xBr_y \quad (2a)$$

wherein each of x and y is an integer of 0 to 2, and satisfies $1 \leq x+y \leq 2$, $R^2$ is a saturated or unsaturated fluorohydrocarbon group or chlorofluorohydrocarbon group having 1 to 16 carbon atoms, or a hydrocarbon group having 1 to 3 carbon atoms, and may contain an oxygen atom. The so-introduced iodine atom or bromine atom functions as peroxide-crosslinkable cure site.

Examples of the compound represented by the formula (2a) are 1,3-dfiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and monoiodo-monobromo-substituted product, diiodo-monobromo-substituted product, and (2-iodoethyl)- or (2-bromoethyl)-substituted product of benzene. These compounds may be used alone, or can be used in combination thereof.

In these compounds, 1,4-diiodoperfluorobutane and diiodomethane are preferred from the viewpoint of polymerization reactivity, crosslinking reactivity and availability.

In the case where the fluorine-containing elastomer (a1) is a fluorine-containing rubber, the amount of diiodine compound is preferably 0.0001 to 5% by mass based on the total amount of the fluorine-containing rubber.

The fluorine content of the fluorine-containing elastomer (a1) constituting the fluorine-containing elastomer particles (A1) may be optionally selected depending on purpose of the use, and is preferably not less than 65% by mass, further preferably not less than 70% by mass, from the viewpoint of improvement in composite dispersibility with a fluorine-containing resin in the case of using a fluorine-containing resin as the synthetic resin (E). Also, from the viewpoint of efficiently advancing peroxide crosslinking, a fluorine-containing elastomer having an iodine atom, especially preferably at least three iodine atoms per one polymer molecule at an end thereof is preferred.

The crosslinking reaction of the fluorine-containing elastomer particles (A1) is carried out so as to give a gel fraction of not less than 85% by mass after the crosslinking. The crosslinking reaction may be conducted by the peroxide crosslinking explained infra in the sixth invention or usual peroxide crosslinking, or the crosslinking may be initiated by irradiation of active energy rays such as ultraviolet rays and radiation at normal temperature, and in this case, a crosslinking auxiliary, a sensitizer or the like may be used together.

In addition, peroxide crosslinking reaction and crosslinking reaction with active energy rays may be employed together. Also, an embodiment essentially employing crosslinking reaction with active energy rays is one of suitable embodiments, that is, a process for preparing crosslinked fluorine-containing elastomer fine particles by irradiating the aqueous dispersion comprising the fluorine-containing elastomer particles (A1) and the polyfunctional unsaturated compound with active energy rays at normal temperature to crosslink the fluorine-containing elastomer particles (A1) with active energy rays.

In addition, the following crosslinking embodiments can be employed.
(i) A method of undergoing crosslinking during the polymerization by adding a monomer having two or more ethylenically unsaturated groups during the polymerization.
(ii) A method of undergoing polyol crosslinking with bisphenol AF, acid acceptor, onium salt, or the like.
(iii) A method of undergoing amine crosslinking with amine crosslinking agent, acid acceptor, or the like.

After completion of the crosslinking reaction, the obtained crosslinked fluorine-containing elastomer fine particles (D1) can be separated and recovered by a method such as a freeze coagulation method, a salting-out method, an acid coagulation method or the like method. Among these, a freeze coagulation method is preferred from the viewpoint of satisfactory shape of particles after the coagulation.

An average particle size of the crosslinked fluorine-containing elastomer fine particles (D1) is preferably 0.01 to 0.5 µm from the viewpoint of improvement in composite dispersibility with the synthetic resin (E), especially a fluorine-containing resin and improvement in physical properties. The average particle size is further preferably not more than 0.3 µm, especially not more than 0.2 µm, and not less than 0.05 µm, especially not less than 0.1 µm.

The fluorine content of the crosslinked fluorine-containing elastomer fine particles (D1) is preferably not less than 65% by mass, further preferably not less than 70% by mass, from the viewpoint of improvement in composite dispersibility with a fluorine-containing resin in the case of using a fluorine-containing resin as the synthetic resin (E).

Such crosslinked fluorine-containing elastomer fine particles (D1) may be blended either in the form of powder or in the form of aqueous dispersion depending on application and kind of the synthetic resin (E). Especially preferred is a method of mixing the crosslinked fluorine-containing elastomer fine particles (D1) in the form of aqueous dispersion with the synthetic resin (E) and carrying out co-coagulation.

The synthetic resin (E) may be, for example, a curable resin, and from the viewpoint of making the best use of characteristics of the crosslinked fluorine-containing elastomer fine particles (D1) as an elastomer, a thermoplastic resin is preferred.

Examples of a thermoplastic resin are fluorine-containing resin, polyethylene, polypropylene, polyvinyl chloride, polyvinylidene chloride, polystyrene, polyvinyl acetate, acrylonitrile-butadiene-styrene resin, acrylic resin, polyamide, polyacetal, polycarbonate, polybutylene terephthalate, polyethylene terephthalate, polyphenylene sulfide, polysulphone, polyether sulphone, polyether ether ketone, polyimide, and polyamide imide.

A fluorine-containing resin is not limited particularly, and is preferably a fluorine-containing resin comprising at least one fluorine-containing ethylenic polymer. It is preferable that the fluorine-containing ethylenic polymer has at least one structural unit derived from a fluorine-containing ethylenic monomer. Examples of the fluorine-containing ethylenic monomer are perfluoroolefins such as tetrafluoroethylene (TFE) and perfluoro ethylenically unsaturated compounds represented by the formula (1):

wherein $R_f^1$ is $-CF_3$ and/or $-OR_f^2$, where $R_f^2$ is a perfluoroalkyl group having 1 to 5 carbon atoms; and fluoroolefins such as chlorotrifluoroethylene (CTFE), trifluoroethylene, hexafluoroisobutene, vinylidene fluoride (VdF), vinyl fluoride and compounds of the formula:

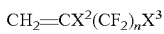

wherein $X^2$ represents hydrogen atom or fluorine atom, $X^3$ represents hydrogen atom, fluorine atom or chlorine atom, n is an integer of 1 to 10.

The fluorine-containing ethylenic polymer may contain a structural unit derived from a monomer being copolymerizable with the above-mentioned fluorine-containing ethylenic monomer, and examples of such a monomer are non-fluorine-containing ethylenic monomers other than the above-mentioned fluoroolefins and perfluoroolefins. Examples of non-fluorine-containing ethylenic monomers are ethylene, propylene and alkyl vinyl ethers. Here, these alkyl vinyl ethers are alkyl vinyl ethers having an alkyl group having 1 to 5 carbon atoms.

Among these, from the viewpoint of satisfactory heat resistance, chemical resistance and oil resistance of the obtained fluorine-containing resin composition and easy mold-processing, polymers of the following (1) to (5) can be exemplified as especially preferred fluorine-containing ethylenic polymer. The fluorine-containing ethylenic polymer is not limited to them and may be selected depending on purpose and application.

(1) Ethylene-TFE copolymer comprising ethylene and TFE (hereinafter also referred to as ETFE)
(2) TFE-PAVE copolymer (PFA) or TFE-HFP copolymer (FEP) comprising TFE and a perfluoro ethylenically unsaturated compound represented by the formula (1):

$$CF_2=CF-R_f^1 \quad (1)$$

wherein $R_f^1$ is $-CF_3$ and/or $-OR_f^2$, where $R_f^2$ is a perfluoroalkyl group having 1 to 5 carbon atoms (3) Ethylene-TFE-HFP copolymer or copolymer of ethylene-TFE-perfluoro ethylenically unsaturated compound comprising TFE, ethylene and a perfluoro ethylenically unsaturated compound represented by the above-mentioned formula (1)
(4) Polyvinylidene fluoride (PVDF)
(5) Copolymer of CTFE-TFE-perfluoro ethylenically unsaturated compound comprising CTFE, TFE and the perfluoro ethylenically unsaturated compound represented by the above-mentioned formula (1)

Any of these polymers are preferred, and the fluorine-containing ethylenic polymers represented by (1), (2) and (5) are preferred.

Next, the preferred fluorine-containing ethylenic polymers of (1), (2) and (5) are explained below.

(1) ETFE

ETFE is preferred since dynamic physical properties and fuel-barrier property in addition to the above-mentioned functions and effects are exhibited. A molar ratio of a TFE unit to an ethylene unit is preferably 20:80 to 90:10, more preferably 38:62 to 85:15, especially preferably 37:63 to 80:20. Also, ETFE may contain a third component, and kind of the third component is not limited as far as it is copolymerizable with TFE and ethylene. Usually monomers represented by the formulas:

$$CH_2=CX^4R_f^5, CF_2=CFR_f^5, CF_2=CFOR_f^5 \text{ and } CH_2=C(R_f^5)_2,$$

wherein $X^4$ is hydrogen atom or fluorine atom, $R_f^5$ is a fluoroalkyl group which may contain ether linkage-formable oxygen atom, are used as the third component. Among these, fluorine-containing vinyl monomers represented by $CH_2=CX^4R_f^5$ are preferred, and monomers having $R_f^5$ having 1 to 8 carbon atoms are especially preferred.

Examples of the fluorine-containing vinyl monomer represented by the above-mentioned formula are 1,1-dihydroperfluoropropene-1, 1,1-dihydroperfluorobutene-1, 1,1,5-trihydroperfluoropentene-1, 1,1,7-trihydroperfluoroheptene-1, 1,1,2-trihydroperfluorohexene-1, 1,1,2-trihydroperfluorooctene-1, 2,2,3,3,4,4,5,5-octafluoropentyl vinyl ether, perfluoro(methyl vinyl ether), perfluoro(propyl vinyl ether), hexafluoropropene, perfluorobutene-1, 3,3,3-trifluoro-2-(trifluoromethyl)propene-1 and 2,3,3,4,4,5,5-heptafluoro-1-pentene ($CH_2=CFCF_2CF_2CF_2H$).

The amount of third component is preferably 0.1 to 10% by mole, more preferably 0.1 to 5% by mole, especially preferably 0.2 to 4% by mole based on the fluorine-containing ethylenic polymer.

(2) PFA or FEP

PFA or FEP is preferred since among the above-mentioned functions and effects, especially heat resistance is excellent and satisfactory fuel barrier property is exhibited in addition to the above-mentioned functions and effects. Nonlimiting example thereof is preferably a copolymer comprising 70 to 99% by mole of the TFE unit and 1 to 30% by mole of the perfluoro ethylenically unsaturated compound unit represented by the formula (1), and is more preferably a copolymer comprising 80 to 97% by mole of the TFE unit and 3 to 20% by mole of the perfluoro ethylenically unsaturated compound unit represented by the formula (1). When the amount of TFE unit is less than 70% by mole, mechanical properties tend to be lowered, and when the amount of TFE unit exceeds 99% by mole, there is a tendency that a melting point becomes too high and moldability is lowered. Also, the fluorine-containing ethylenic polymer comprising TFE and the perfluoro ethylenically unsaturated compound represented by the formula (1) may contain a third component, and kind of the third component is not limited as far as it is copolymerizable with TFE and the perfluoro ethylenically unsaturated compound represented by the formula (1).

(5) CTFE-TFE Copolymer

In the case of a CTFE-TFE copolymer, a molar ratio of a CTFE unit to a TFE unit is preferably 2:98 to 98:2, more preferably 5:95 to 90:10. When the amount of CTFE unit is less than 2% by mole, there is a tendency that permeability of chemicals is lowered and melt-processing becomes difficult, and when the amount of CTFE unit exceeds 98% by mole, there is a case where heat resistance and chemical resistance at molding are lowered. Also, it is preferable to copolymerize the perfluoro ethylenically unsaturated compound, and the amount of perfluoro ethylenically unsaturated compound unit is preferably 0.1 to 10% by mole based on the total amount of CTFE unit and TFE unit, and the total amount of CTFE unit and TFE unit is preferably 90 to 99.9% by mole. When the amount of perfluoro ethylenically unsaturated compound unit is less than 0.1% by mole, moldability, resistance to environmental stress cracking and resistance to stress cracking are liable to be inferior, and when the amount exceeds 10% by mole, low permeability of chemicals, heat resistance, mechanical properties and productivity tend to be inferior.

A mixing ratio of the crosslinked fluorine-containing elastomer fine particles (D1) to the synthetic resin (E), especially a fluorine-containing resin is preferably 0.1/99.9 to 25/75, further preferably 0.5/99.5 to 25/75, especially preferably 1/99 to 20/80 in a mass ratio ((D1)/(E)). A too large proportion of the crosslinked fluorine-containing elastomer fine particles (D1) is not preferred because strength at break of the composition is decreased excessively and fuel barrier property is lowered.

The composition comprising the crosslinked fluorine-containing elastomer fine particles (D1) and a fluorine-containing resin exhibits excellent performance when used as a fuel hose, a dynamic sealing material and a soft resin.

When preparing a composition for a fuel hose, it is preferable to use FEP, PFA and ETFE as a fluorine-containing resin, and in this case, a mass ratio of the crosslinked fluorine-containing elastomer fine particles (D1) to the fluorine-containing resin is preferably 0.1/99.9 to 25/75, further preferably 0.5/99.5 to 25/75, especially preferably 1/99 to 20/80 since especially fuel barrier property is enhanced.

When preparing a composition for a dynamic sealing material, it is preferable to use FEP, PFA and ETFE as a fluorine-containing resin, and in this case, a mass ratio of the crosslinked fluorine-containing elastomer fine particles (D1) to the fluorine-containing resin is preferably 0.1/99.9 to 25/75, further preferably 0.5/99.5 to 25/75, more preferably 1/99 to 25/75, especially preferably 5/95 to 20/80 since flexibility and sealing property are satisfactory.

When preparing a composition for a soft resin, it is preferable to use FEP, PFA and ETFE as a fluorine-containing resin, and in this case, a mass ratio of the crosslinked fluorine-containing elastomer fine particles (D1) to the fluorine-containing resin is preferably 0.1/99.9 to 25/75, further preferably 0.5/99.5 to 25/75, more preferably 1/99 to 25/75, especially preferably 5/95 to 20/80 from the viewpoint of low elastic modulus.

The composition comprising the crosslinked fluorine-containing elastomer fine particles (D1) and the synthetic resin (E) may be prepared by a dry blend method using a mixer such as a banbury mixer or a rotary stirrer, or a homogeneous composition may be prepared by mixing an aqueous dispersion (aqueous dispersion after crosslinking) of the crosslinked fluorine-containing elastomer fine particles (D1) with an aqueous dispersion of the synthetic resin (E) fine particles and then co-coagulating the mixture.

In the first invention, especially in the field where neither high purity nor non-contaminating property is demanded, it is possible to blend usual additives, for example, filler, processing aid, plasticizer, coloring agent and the like which are blended to resin compositions according to necessity, and one or more usual crosslinking agent and crosslinking auxiliary may be blended.

Next, the second invention is explained below.

The second invention relates to the crosslinked fluorine-containing elastomer fine particles (D2) obtained by crosslinking the particles (A2) of the fluorine-containing elastomer (a2) having at least three iodine atoms per one polymer molecule at an end thereof.

Since the fluorine-containing elastomer (a2) has at least three iodine atoms per one polymer molecule at an end thereof, this end iodine becomes cure site, which makes it possible to obtain crosslinked fluorine-containing elastomer fine particles having high crosslinking density and enables peroxide crosslinking. The iodine atom may be bonded to an end of a polymer trunk chain, an end of a polymer side chain or the both of them.

The number of iodine ends is three or more per one polymer molecule, preferably four or more.

It is preferable that the fluorine-containing elastomer (a2) having at least three iodine atoms per one polymer molecule at an end thereof has a structural unit derived from at least one monomer selected from the group consisting of tetrafluoroethylene, vinylidene fluoride and perfluoro ethylenically unsaturated compound represented by the formula (1):

$$CF_2=CF-R_f^1 \quad (1)$$

wherein $R_f^1$ is $-CF_3$ or $-OR_f^2$, where $R_f^2$ is a perfluoroalkyl group having 1 to 5 carbon atoms, since particles having properties of an elastic rubber can be obtained.

Preferred examples of a fluorine-containing rubber are non-perfluoro fluorine-containing rubber (a2-1) and perfluoro fluorine-containing rubber (a2-2).

Examples of the non-perfluoro fluorine-containing rubber (a2-1) are vinylidene fluoride (VdF) type fluorine-containing rubbers, tetrafluoroethylene (TFE)/propylene type fluorine-containing rubbers, tetrafluoroethylene (TFE)/propylene/vinylidene fluoride (VdF) type fluorine-containing rubbers, ethylene/hexafluoropropylene (HFP) type fluorine-containing rubbers, ethylene/hexafluoropropylene (HFP)/vinylidene fluoride (VdF) type fluorine-containing rubbers, ethylene/hexafluoropropylene (HFP)/tetrafluoroethylene (TFE) type fluorine-containing rubbers, fluorosilicone type fluorine-containing rubbers, fluorophosphazene type fluorine-containing rubbers, and the like. Those rubbers can be used alone or can be used in an optional combination thereof to such an extent not to impair the effect of the present invention. Among these, vinylidene fluoride type fluorine-containing rubbers and tetrafluoroethylene/propylene type fluorine-containing rubbers are more suitable.

Specifically, in the above-mentioned VdF type rubbers, the amount of VdF repeat units is preferably not less than 20% by mole and not more than 90% by mole, more preferably not less than 40% by mole and not more than 85% by mole based on the total number of moles of the VdF repeat units and the repeat units derived from other comonomers in the above-mentioned VdF type elastomer. Further, a preferred lower limit is 45% by mole, especially preferably 50% by mole, and a preferred upper limit is 80% by mole.

Other monomers in the above-mentioned VdF type rubber are not limited particularly as far as they are copolymerizable with VdF. Examples thereof are fluorine-containing monomers such as TFE, HFP, PAVE, CTFE, trifluoroethylene, trifluoropropylene, tetrafluoropropylene, pentafluoropropylene, trifluorobutene, tetrafluoroisobutene, vinyl fluoride and iodine-containing fluorinated vinyl ether; and non-fluorine-containing monomers such as ethylene (Et), propylene (Pr) and alkyl vinyl ether. One out of these fluorine-containing monomers and non-fluorine-containing monomers can be used or two or more thereof can be used in combination. Preferred examples of the above-mentioned PAVE are perfluoro(methyl vinyl ether) and perfluoro(propyl vinyl ether), and especially perfluoro(methyl vinyl ether) is preferred.

Preferred examples of the above-mentioned VdF type rubbers are a VdF/HFP copolymer, a VdF/HFP/TFE copolymer, a VdF/CTFE copolymer, a VdF/CTFE/TFE copolymer, a VdF/PAVE copolymer, a VdF/TFE/PAVE copolymer, a VdF/HFP/PAVE copolymer, a VdF/HFP/TFE/PAVE copolymer, a VdF/TFE/Pr copolymer, and a VdF/Et/HFP copolymer, and more preferred examples are those comprising TFE, HFP and/or PAVE as other monomer, and especially preferred are a VdF/HFP copolymer, a VdF/HFP/TFE copolymer, a VdF/PAVE copolymer, a VdF/TFE/PAVE copolymer, a VdF/HFP/PAVE copolymer and a VdF/HFP/TFE/PAVE copolymer.

In the VdF/HFP copolymer, a ratio of VdF/HFP is preferably 45 to 85/55 to 15 (molar percent), more preferably 50 to 80/50 to 20 (molar percent), further preferably 60 to 80/40 to 20 (molar percent).

A preferred VdF/HFP/TFE copolymer is one comprising VdF/HFP/TFE in a ratio of 40 to 80/10 to 35/10 to 25 (molar percent).

A preferred VdF/PAVE copolymer is one comprising VdF/PAVE in a ratio of 65 to 90/10 to 35 (molar percent).

A preferred VdF/TFE/PAVE copolymer is one comprising VdF/TFE/PAVE in a ratio of 40 to 80/3 to 40/15 to 35 (molar percent).

A preferred VdF/HFP/PAVE copolymer is one comprising VdF/HFP/PAVE in a ratio of 65 to 90/3 to 25/3 to 25 (molar percent).

A preferred VdF/HFP/TFE/PAVE copolymer is one comprising VdF/HFP/TFE/PAVE in a ratio of 40 to 90/0 to 25/0 to 40/3 to 35 (molar percent), more preferably one comprising VdF/HFP/TFE/PAVE in a ratio of 40 to 80/3 to 25/3 to 40/3 to 25 (molar percent).

Tetrafluoroethylene/propylene type fluorine-containing rubbers are fluorine-containing copolymers comprising 45 to 70% by mole of tetrafluoroethylene and 55 to 30% by mole of propylene. In addition to these two components, a specific third component (for example, PAVE) may be contained in an amount of 0 to 40% by mole.

Examples of the perfluoro fluorine-containing rubber (a2-2) are ones comprising TFE/PAVE. A ratio of TFE/PAVE is preferably 50 to 90/50 to 10 in molar percent, more preferably 50 to 80/50 to 20 in molar percent, further preferably 55 to 70/45 to 30 in molar percent.

In this case, examples of the PAVE are perfluoro(methyl vinyl ether), perfluoro(propyl vinyl ether) and the like, and these can be used alone or can be used in an optional combination thereof.

Preferred examples of the fluorine-containing elastomer (a2) are peroxide-crosslinkable fluorine-containing rubbers, and specifically it is preferable that the fluorine-containing elastomer (a2) contains iodine atom in an amount of 0.01 to 10% by mass, more preferably 0.05 to 2% by mass. When the amount is less than 0.01% by mass, there is a tendency that crosslinking is insufficient, thereby lowering compression set, and when the amount exceeds 10% by mass, there is a tendency that crosslinking density becomes too high, thereby lowering rubber performance, for example, elongation becomes too small.

Examples of the fluorine-containing elastomer (a2) having iodine atom are the above-mentioned non-perfluoro fluorine-containing rubber (a2-1) and perfluoro fluorine-containing rubber (a2-2), ones having a repeat unit derived from a specific iodine atom-containing monomer (which is also called a monomer providing a peroxide-crosslinkable cure site), and ones prepared by iodine transfer polymerization explained infra.

Examples of a specific iodine atom-containing monomer are compounds represented by the formula (3b):

$$CY^1{}_2=CY^2R_f^1X^1 \quad (3b)$$

wherein $Y^1$ and $Y^2$ are fluorine atom, hydrogen atom or $-CH_3$; $R_f^1$ is a linear or branched fluoroalkylene or perfluoroalkylene group which may have an ether linkage-formable oxygen atom; $X^1$ is iodine atom, and for example, there are iodine-containing monomers represented by the formula (4b):

$$CY^1{}_2=CY^2R_f^3CHR^1-X^1 \quad (4b)$$

wherein $Y^1$, $Y^2$ and $X^1$ are as defined in the formula (3b), $R_f^3$ is a linear or branched fluoroalkylene group, perfluoroalkylene group, fluorooxyalkylene group, perfluorooxyalkylene group, or perfluoropolyoxyalkylene group which may have at least one ether type oxygen atom; $R^1$ is hydrogen atom or methyl group, and iodine-containing monomers represented by the formulas (5b) to (22b):

$$CY^4{}_2=CY^4(CF_2)_n-X^1 \quad (5b)$$

where $Y^4$ is hydrogen atom or fluorine atom, n is an integer of 1 to 8, $$CF_2=CFCF_2R_f^4-X^1 \quad (6b)$$

where $R_f^4$ is $OCF_{2n}$ or $OCF(CF_3)_n$, n is 0 or an integer of 1 to 5, $$CF_2=CFCF_2(OCF(CF_3)CF_2)_m(OCH_2CF_2CF_2)_n OCH_2CF_2-X^1 \quad (7b)$$

where m is 0 or an integer of 1 to 5, n is 0 or an integer of 1 to 5, $$CF_2=CFCF_2(OCH_2CF_2CF_2)_m(OCF(CF_3)CF_2)_nOCF(CF_3)-X^1 \quad (8b)$$

where m is 0 or an integer of 1 to 5, n is 0 or an integer of 1 to 5, $$CF_2=CF(OCF_2CF(CF_3))_mO(CF_2)_n-X^1 \quad (9b)$$

where m is 0 or an integer of 1 to 5, n is an integer of 1 to 8, $$CF_2=CF(OCF_2CF(CF_3))_m-X^1 \quad (10b)$$

where m is an integer of 1 to 5, $$CF_2=CFOCF_2(CF(CF_3)OCF_2)_nCF(-X^1)CF_3 \quad (11b)$$

where n is an integer of 1 to 4, $$CF_2=CFO(CF_2)_nOCF(CF_3)-X^1 \quad (12b)$$

where n is an integer of 2 to 5, $$CF_2=CFO(CF_2)_n-(C_6H_4)-X^1 \quad (13b)$$

where n is an integer of 1 to 6, $$CF_2=CF(OCF_2CF(CF_3))_nOCF_2CF(CF_3)-X^1 \quad (14b)$$

where n is an integer of 1 to 2, $$CH_2=CFCF_2O(CF(CF_3)CF_2O)_nCF(CF_3)-X^1 \quad (15b)$$

where n is 0 or an integer of 1 to 5, $$CF_2=CFO(CF_2CF(CF_3)O)_m(CF_2)_n-X^1 \quad (16b)$$

where m is 0 or an integer of 1 to 5, n is an integer of 1 to 3, $$CH_2=CFCF_2OCF(CF_3)OCF(CF_3)-X^1 \quad (17b)$$

$$CH_2=CFCF_2OCH_2CF_2-X^1 \quad (18b)$$

$$CF_2=CFO(CF_2CF(CF_3)O)_mCF_2CF(CF_3)-X^1 \quad (19b)$$

where m is an integer of not less than 0, $$CF_2=CFOCF(CF_3)CF_2O(CF_2)_n-X^1 \quad (20b)$$

where n is an integer of not less than 1, $$CF_2=CFOCF_2OCF_2CF(CF_3)OCF_2-X^1 \quad (21b), \text{ and}$$

$$CH_2=CH-(CF_2)_nX^1 \quad (22b)$$

where n is an integer of 2 to 8,
(in the formulas (5b) to (22b), $X^1$ is iodine atom), and these can be used alone or can be used in an optional combination thereof.

Preferred examples of the iodine-containing monomer represented by the formula (4b) are iodine-containing fluorinated vinyl ethers represented by the formula (23):

$$I(CH_2CF_2CF_2O)_m(\overset{CF_3}{\underset{|}{C}}FCF_2O)_nCF=CF_2 \quad (23)$$

where m is an integer of 1 to 5, n is 0 or an integer of 1 to 3, and more specifically there are $$ICH_2CF_2CF_2OCF=CF_2, \quad I(CH_2CF_2CF_2O)_2CF=CF_2,$$

$$I(CH_2CF_2CF_2O)_3CF=CF_2,$$

$$ICH_2CF_2CF_2O\overset{CF_3}{\underset{|}{C}}FCF_2OCF=CF_2,$$

$$ICH_2CF_2CF_2O(\overset{CF_3}{\underset{|}{C}}FCF_2O)_2CF=CF_2$$

and the like, and among these, $ICH_2CF_2CF_2OCF=CF_2$ is preferred.

More specifically, preferred examples of the iodine-containing monomer represented by the formula (5b) are $ICF_2CF_2CF=CH_2$ and $I(CF_2CF_2)_2CF=CH_2$.

More specifically, preferred example of the iodine-containing monomer represented by the formula (9b) is $I(CF_2CF_2)_2OCF=CF_2$.

More specifically, preferred examples of the iodine-containing monomer represented by the formula (22b) are $CH_2=CHCF_2CF_2I$ and $I(CF_2CF_2)_2CH=CH_2$.

Among the compounds represented by the above-mentioned formulas (4b) to (22b), monomers having $X^1$ of cyano group (—CN group), carboxyl group (—COOH group) or alkoxycarbonyl group (—COOR group, where R is an alkyl group which has 1 to 10 carbon atoms and may have fluorine atom) may be used together with the compound represented by the general formula (1).

When structural units derived from these iodine atom-containing monomers are contained, the amount thereof is preferably not less than 2% by mole and not more than 10% by mole based on the total number of moles of such structural units and repeat units derived from other comonomers.

For iodine transfer polymerization, for example, there is exemplified a method of carrying out emulsion polymerization of the above-mentioned monomer constituting the fluorine-containing elastomer (a2), a monomer for forming an iodine end such as $ICH_2CF_2CF_2OCF=CF_2$ and, if necessary, a monomer giving peroxide-crosslinkable cure site other than iodine in the presence of an iodine compound, preferably a diiodine compound with stirring under pressure in the presence of a radical initiator in an aqueous medium substantially in the absence of oxygen. A representative example of the diiodine compound to be used is a compound represented by the formula (2b):

$$IR^2I \qquad (2b)$$

wherein $R^2$ is a saturated or unsaturated fluorohydrocarbon group or chlorofluorohydrocarbon group having 1 to 16 carbon atoms, or a hydrocarbon group having 1 to 3 carbon atoms, and is a divalent group which may contain an oxygen atom. The so-introduced iodine atom functions as peroxide-crosslinkable cure site.

Examples of the compound represented by the formula (2b) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, and diiodo-monobromo-substituted product of benzene. These compounds may be used alone, or can be used in combination thereof.

In these compounds, 1,4-diiodoperfluorobutane and diiodomethane are preferred from the viewpoint of polymerization reactivity, crosslinking reactivity and availability.

In the case where the fluorine-containing elastomer (a2) is a fluorine-containing rubber, the amount of diiodine compound is preferably 0.0001 to 5% by mass based on the total amount of the fluorine-containing rubber.

The fluorine content of the fluorine-containing elastomer (a2) constituting the fluorine-containing elastomer particles (A2) may be optionally selected depending on purpose of the use, and is preferably not less than 65% by mass, further preferably not less than 70% by mass, from the viewpoint of improvement in composite dispersibility with a fluorine-containing resin in the case of blending to the synthetic resin, especially to a fluorine-containing resin.

Example of a method of introducing at least three iodine atoms per one polymer molecule to an end thereof is, for example, the following method.

The number of terminal iodine atoms of the fluorine-containing elastomer (a2) can be calculated from a reaction scheme and amount (consumption) of iodine-containing compounds to be used (for example, a polymerization initiator, a chain transfer agent and a monomer constituting the fluorine-containing elastomer). Also, it can be calculated by measurement of a molecular weight of the produced elastomer, elemental analysis and measurement with NMR. (I) Method of copolymerizing a monomer providing peroxide-crosslinkable iodine end.

For specific conditions of this method and resultant reactants thereof, for example, refer to the descriptions in Japanese Patent Application No. 11-244653.

In the present invention, especially the following reactants are suitable.

Monomer: Examples of a monomer providing a peroxide-crosslinkable iodine end are iodine-containing monomers represented by the formula (24):

$$CX^5_2=CX^1-R_f^1CHR^1I \qquad (24)$$

wherein $X^5$ is H, F or $CH_3$; $R_f^1$ is a fluoroalkylene group, a perfluoroalkylene group, a fluoropolyoxyalkylene group or a perfluoropolyoxyalkylene group; $R^1$ is H or $CH_3$. Other examples are iodine-containing monomers such as perfluoro (6,6-dihydro-6-iodo-3-oxa-1-hexene) and perfluoro(5-iodo-3-oxa-1-pentene) described in JP5-63482B and JP7-316234A. These can be used alone or can be used in an optional combination thereof.

The crosslinking reaction of the fluorine-containing elastomer particles (A2) is carried out by the peroxide crosslinking explained infra in the sixth invention or usual peroxide crosslinking, or the crosslinking may be initiated by irradiation of active energy rays such as ultraviolet rays and radiation at normal temperature, and in this case, a crosslinking auxiliary, a sensitizer or the like may be used together.

In addition, peroxide crosslinking reaction and crosslinking reaction with active energy rays may be employed together. Also, an embodiment essentially employing crosslinking reaction with active energy rays is one of suitable embodiments, that is, a process for preparing crosslinked fluorine-containing elastomer fine particles by irradiating the aqueous dispersion comprising the fluorine-containing elastomer particles (A2) and the polyfunctional unsaturated compound with active energy rays at normal temperature to crosslink the fluorine-containing elastomer particles (A2) with active energy rays.

In addition, the following crosslinking embodiments can be employed.
(i) A method of undergoing crosslinking during the polymerization by adding a monomer having two or more ethylenic unsaturated groups during the polymerization.
(ii) A method of undergoing polyol crosslinking with bisphenol AF, acid acceptor, onium salt, or the like.
(iii) A method of undergoing amine crosslinking with amine crosslinking agent, acid acceptor, or the like.

After completion of the crosslinking reaction, the obtained crosslinked fluorine-containing elastomer fine particles (D2) can be separated and recovered by a method such as a freeze coagulation method, a salting-out method, an acid coagulation method or the like method. Among these, a freeze coagulation method is preferred from the viewpoint of satisfactory shape of particles after the coagulation.

An average particle size of the crosslinked fluorine-containing elastomer fine particles (D2) is preferably 0.01 to 0.5 µm from the viewpoint of improvement in composite dispersibility with the synthetic resin (E), especially a fluorine-containing resin and improvement in physical properties. The average particle size is further preferably not more than 0.3 µm, especially not more than 0.2 µm, and not less than 0.05 µm, especially not less than 0.1 µm.

The fluorine content of the crosslinked fluorine-containing elastomer fine particles (D2) is preferably not less than 65% by mass, further preferably not less than 70% by mass, from the viewpoint of improvement in composite dispersibility with a fluorine-containing resin in the case of using a fluorine-containing resin as the synthetic resin (E).

For example, as explained infra in the third invention, the composition comprising the crosslinked fluorine-containing elastomer fine particles (D2) and the synthetic resin improves characteristics such as low elastic modulus, flexibility and fuel barrier property, and can provide materials useful as a fuel hose, a dynamic sealing material and a soft resin.

The third invention relates to the composition comprising the crosslinked fluorine-containing elastomer fine particles (D2) and the synthetic resin (E).

The synthetic resin (E) may be, for example, a curable resin, and from the viewpoint of making the best use of characteristics of the crosslinked fluorine-containing elastomer fine particles (D2) as an elastomer, a thermoplastic resin is preferred.

Examples of a thermoplastic resin are fluorine-containing resin, polyethylene, polypropylene, polyvinyl chloride, polyvinylidene chloride, polystyrene, polyvinyl acetate, acrylonitrile-butadiene-styrene resin, acrylic resin, polyamide, polyacetal, polycarbonate, polybutylene terephthalate, polyethylene terephthalate, polyphenylene sulfide, polysulphone, polyether sulphone, polyether ether ketone, polyimide, and polyamide imide.

A fluorine-containing resin is not limited particularly, and is preferably a fluorine-containing resin comprising at least one fluorine-containing ethylenic polymer. It is preferable that the fluorine-containing ethylenic polymer has a structural unit derived from at least one fluorine-containing ethylenic monomer. Examples of the fluorine-containing ethylenic monomer are perfluoroolefins such as tetrafluoroethylene (TFE) and perfluoro ethylenically unsaturated compounds represented by the formula (1):

$$CF_2=CF-R_f^1 \qquad (1)$$

wherein $R_f^1$ is $-CF_3$ and/or $-OR_f^2$, where $R_f^2$ is a perfluoroalkyl group having 1 to 5 carbon atoms; and fluoroolefins such as chlorotrifluoroethylene (CTFE), trifluoroethylene, hexafluoroisobutene, vinylidene fluoride (VdF), vinyl fluoride and compounds of the formula:

$$CH_2=CX^2(CF_2)_nX^3$$

wherein $X^2$ represents hydrogen atom or fluorine atom, $X^3$ represents hydrogen atom, fluorine atom or chlorine atom, n is an integer of 1 to 10.

The fluorine-containing ethylenic polymer may contain a structural unit derived from a monomer being copolymerizable with the above-mentioned fluorine-containing ethylenic monomer, and examples of such a monomer are non-fluorine-containing ethylenic monomers other than the above-mentioned fluoroolefins and perfluoroolefins. Examples of non-fluorine-containing ethylenic monomers are ethylene, propylene and alkyl vinyl ethers. Here, these alkyl vinyl ethers are alkyl vinyl ethers having an alkyl group having 1 to 5 carbon atoms.

Among these, from the viewpoint of satisfactory heat resistance, chemical resistance and oil resistance of the obtained fluorine-containing resin composition and easy mold-processing, polymers of the following (1) to (5) can be exemplified as especially preferred fluorine-containing ethylenic polymers. The fluorine-containing ethylenic polymer is not limited to them and may be selected depending on purpose and application.

(1) Ethylene-TFE copolymer comprising ethylene and TFE (hereinafter also referred to as ETFE)
(2) TFE-PAVE copolymer (PFA) or TFE-HFP copolymer (FEP) comprising TFE and a perfluoro ethylenically unsaturated compound represented by the formula (1):

$$CF_2=CF-R_f^1 \qquad (1)$$

wherein $R_f^1$ is $-CF_3$ and/or $-OR_f^2$, where $R_f^2$ is a perfluoroalkyl group having 1 to 5 carbon atoms
(3) Ethylene-TFE-HFP copolymer or copolymer of ethylene-TFE-perfluoro ethylenically unsaturated compound comprising TFE, ethylene and the perfluoro ethylenically unsaturated compound represented by the above-mentioned formula (1)
(4) Polyvinylidene fluoride (PVDF)
(5) Copolymer of CTFE-TFE-perfluoro ethylenically unsaturated compound comprising CTFE, TFE and the perfluoro ethylenically unsaturated compound represented by the above-mentioned formula (1)

Any of these polymers are preferred, and the fluorine-containing ethylenic polymers represented by (1), (2) and (5) are preferred.

Next, the preferred fluorine-containing ethylenic polymers of (1), (2) and (5) are explained below.
(1) ETFE ETFE is preferred since dynamic physical properties and fuel-barrier property in addition to the above-mentioned functions and effects are exhibited. A molar ratio of a TFE unit to an ethylene unit is preferably 20:80 to 90:10, more preferably 38:62 to 85:15, especially preferably 37:63 to 80:20. Also, ETFE may contain a third component, and kind of the third component is not limited as far as it is copolymerizable with TFE and ethylene. Usually monomers represented by the formulas:

$$CH_2=CX^4R_f^5, CF_2=CFR_f^5, CF_2=CFOR_f^5 \text{ and}$$
$$CH_2=C(R_f^5)_2,$$

wherein $X^4$ is hydrogen atom or fluorine atom, $R_f^5$ is a fluoroalkyl group which may contain ether linkage-formable oxygen atom, are used as the third component. Among these, fluorine-containing vinyl monomers represented by $CH_2=CX^4R_f^5$ are preferred, and monomers having $R_f^5$ having 1 to 8 carbon atoms are especially preferred.

Examples of the fluorine-containing vinyl monomer represented by the above-mentioned formula are 1,1-dihydroperfluoropropene-1, 1,1-dihydroperfluorobutene-1, 1,1,5-trihydroperfluoropentene-1, 1,1,7-trihydroperfluoroheptene-1, 1,1,2-trihydroperfluorohexene-1, 1,1,2-trihydroperfluorooctene-1, 2,2,3,3,4,4,5,5-octafluoropentyl vinyl ether, perfluoro(methyl vinyl ether), perfluoro(propyl vinyl ether), hexafluoropropene, perfluorobutene-1, 3,3,3-trifluoro-2-(trifluoromethyl)propene-1 and 2,3,3,4,4,5,5-heptafluoro-1-pentene ($CH_2=CFCF_2CF_2CF_2H$).

The amount of third component is preferably 0.1 to 10% by mole, more preferably 0.1 to 5% by mole, especially preferably 0.2 to 4% by mole based on the fluorine-containing ethylenic polymer.
(2) PFA or FEP PFA or FEP is preferred since among the above-mentioned functions and effects, especially heat resistance is excellent and satisfactory fuel barrier property is exhibited in addition to the above-mentioned functions and effects. Nonlimiting example thereof is preferably a copolymer comprising 70 to 99% by mole of the TFE unit and 1 to 30% by mole of the perfluoro ethylenically unsaturated compound unit represented by the formula (1), and is more preferably a copolymer comprising 80 to 97% by mole of the TFE unit and 3 to 20% by mole of the perfluoro ethylenically unsaturated compound unit represented by the formula (1). When the amount of TFE unit is less than 70% by mole, mechanical properties tend to be lowered, and when the amount of TFE unit exceeds 99% by mole, there is a tendency that a melting point becomes too high and moldability is lowered. Also, the fluorine-containing ethylenic polymer comprising TFE and the perfluoro ethylenically unsaturated compound represented by the formula (1) may contain a third component, and kind of the third component is not limited as far as it is copolymerizable with TFE and the perfluoro ethylenically unsaturated compound represented by the formula (1).

(5) CTFE-TFE Copolymer

In the case of a CTFE-TFE copolymer, a molar ratio of a CTFE unit to a TFE unit is preferably 2:98 to 98:2, more preferably 5:95 to 90:10. When the amount of CTFE unit is less than 2% by mole, there is a tendency that permeability of chemicals is lowered and melt-processing becomes difficult, and when the amount of CTFE unit exceeds 98% by mole, there is a case where heat resistance and chemical resistance at molding are lowered. Also, it is preferable to copolymerize the perfluoro ethylenically unsaturated compound, and the amount of perfluoro ethylenically unsaturated compound unit is preferably 0.1 to 10% by mole based on the total amount of CTFE unit and TFE unit, and the total amount of CTFE unit and TFE unit is preferably 90 to 99.9% by mole. When the amount of perfluoro ethylenically unsaturated compound unit is less than 0.1% by mole, moldability, resistance to environmental stress cracking and resistance to stress cracking are liable to be inferior, and when the amount exceeds 10% by mole, low permeability of chemicals, heat resistance, mechanical properties and productivity tend to be inferior.

A mixing ratio of the crosslinked fluorine-containing elastomer fine particles (D2) to the synthetic resin (E), especially a fluorine-containing resin is preferably 0.1/99.9 to 25/75, further preferably 0.5/99.5 to 25/75, especially preferably 1/99 to 20/80 in a mass ratio ((D2)/(E)). A too large proportion of the crosslinked fluorine-containing elastomer fine particles (D2) is not preferred because strength at break of the composition is decreased excessively and fuel barrier property is lowered.

The composition comprising the crosslinked fluorine-containing elastomer fine particles (D2) and a fluorine-containing resin exhibits excellent performance when used as a fuel hose, a dynamic sealing material and a soft resin.

When preparing a composition for a fuel hose, it is preferable to use FEP, PFA and ETFE as a fluorine-containing resin, and in this case, a mass ratio of the crosslinked fluorine-containing elastomer fine particles (D2) to the fluorine-containing resin is preferably 0.1/99.9 to 25/75, further preferably 0.5/99.5 to 25/75, especially preferably 1/99 to 20/80 since especially fuel barrier property is enhanced.

When preparing a composition for a dynamic sealing material, it is preferable to use FEP, PFA and ETFE as a fluorine-containing resin, and in this case, a mass ratio of the crosslinked fluorine-containing elastomer fine particles (D2) to the fluorine-containing resin is preferably 0.1/99.9 to 25/75, further preferably 0.5/99.5 to 25/75, more preferably 1/99 to 25/75, especially preferably 5/95 to 20/80 since flexibility and sealing property are satisfactory.

When preparing a composition for a soft resin, it is preferable to use FEP, PFA and ETFE as a fluorine-containing resin, and in this case, a mass ratio of the crosslinked fluorine-containing elastomer fine particles (D2) to the fluorine-containing resin is preferably 0.1/99.9 to 25/75, further preferably 0.5/99.5 to 25/75, more preferably 1/99 to 25/75, especially preferably 5/95 to 20/80 from the viewpoint of low elastic modulus.

The composition comprising the crosslinked fluorine-containing elastomer fine particles (D2) and the synthetic resin (E) may be prepared by a dry blend method using a mixer such as a banbury mixer or a rotary stirrer, or a homogeneous composition may be prepared by mixing an aqueous dispersion (aqueous dispersion after crosslinking) of the crosslinked fluorine-containing elastomer fine particles (D2) with an aqueous dispersion of the synthetic resin (E) fine particles and then co-coagulating the mixture. From the viewpoint of satisfactory dispersibility of the crosslinked fluorine-containing elastomer fine particles (D2), especially a co-coagulation method is preferred.

The crosslinked fluorine-containing elastomer fine particles (D2) may be blended in the form of powder or in the form of aqueous dispersion depending on application and kind of the synthetic resin (E).

In the third invention, especially in the field where neither high purity nor non-contaminating property is demanded, it is possible to blend usual additives, for example, filler, processing aid, plasticizer, coloring agent and the like which are blended to resin compositions according to necessity, and one or more usual crosslinking agent and crosslinking auxiliary may be blended.

The fourth invention of the present invention relates to crosslinked fluorine-containing elastomer fine particles (D3) obtained by crosslinking particles (A3) of a fluorine-containing elastomer (a3) comprising a structural unit derived from an ethylenically unsaturated monomer comprising at least one fluoroolefin and a structural unit derived from an iodine atom- or bromine atom-containing monomer represented by the formula (3c):

$$CY^1{}_2=CY^2R_f^1X^1 \tag{3c}$$

wherein $Y^1$ and $Y^2$ are fluorine atom, hydrogen atom or $-CH_3$; $R_f^1$ is a linear or branched fluoroalkylene or perfluoroalkylene group which may have an ether linkage-formable oxygen atom; $X^1$ is iodine atom or bromine atom.

Examples of the iodine atom- or bromine atom-containing monomers represented by the formula (3c) are iodine-containing monomers and bromine-containing monomers represented by the formula (4c):

$$CY^1{}_2=CY^2R_f^3CHR^1-X^1 \tag{4c}$$

wherein $Y^1$, $Y^2$ and $X^1$ are as defined in the formula (3a), $R_f^3$ is a linear or branched fluoroalkylene group, perfluoroalkylene group, fluorooxyalkylene group, perfluorooxyalkylene group, or perfluoropolyoxyalkylene group which may have at least one ether type oxygen atom; $R^1$ is hydrogen atom or methyl group, and iodine-containing monomers and bromine-containing monomers represented by the formulas (5c) to (22c):

$$CY^4{}_2=CY^4(CF_2)_n-X^1 \tag{5c}$$

where $Y^4$ is hydrogen atom or fluorine atom, n is an integer of 1 to 8, $$CF_2=CFCF_2R_f^4-X^1 \tag{6c}$$

where $R_f^4$ is $OCF_{2n}$ or $OCF(CF_3)_n$, n is 0 or an integer of 1 to 5, $$CF_2=CFCF_2(OCF(CF_3)CF_2)_m(OCH_2CF_2CF_2)_n \\ OCH_2CF_2-X^1 \tag{7c}$$

where m is 0 or an integer of 1 to 5, n is 0 or an integer of 1 to 5, $$CF_2=CFCF_2(OCH_2CF_2CF_2)_m(OCF(CF_3)CF_2)_nOCF \\ (CF_3)-X^1 \tag{8c}$$

where m is 0 or an integer of 1 to 5, n is 0 or an integer of 1 to 5, $$CF_2=CF(OCF_2CF(CF_3))_mO(CF_2)_n-X^1 \tag{9c}$$

where m is 0 or an integer of 1 to 5, n is an integer of 1 to 8, $$CF_2=CF(OCF_2CF(CF_3))_m-X^1 \quad (10c)$$

where m is an integer of 1 to 5, $$CF_2=CFOCF_2(CF(CF_3)OCF_2)_nCF(-X^1)CF_3 \quad (11c)$$

where n is an integer of 1 to 4, $$CF_2=CFO(CF_2)_nOCF(CF_3)-X^1 \quad (12c)$$

where n is an integer of 2 to 5, $$CF_2=CFO(CF_2)_n-(C_6H_4)-X^1 \quad (13c)$$

where n is an integer of 1 to 6, $$CF_2=CF(OCF_2CF(CF_3))_nOCF_2CF(CF_3)-X^1 \quad (14c)$$

where n is an integer of 1 to 2, $$CH_2=CFCF_2O(CF(CF_3)CF_2O)_nCF(CF_3)-X^1 \quad (15c)$$

where n is 0 or an integer of 1 to 5, $$CF_2=CFO(CF_2CF(CF_3)O)_m(CF_2)_n-X^1 \quad (16c)$$

where m is 0 or an integer of 1 to 5, n is an integer of 1 to 3, $$CH_2=CFCF_2OCF(CF_3)OCF(CF_3)-X^1 \quad (17c)$$

$$CH_2=CFCF_2OCH_2CF_2-X^1 \quad (18c)$$

$$CF_2=CFO(CF_2CF(CF_3)O)_mCF_2CF(CF_3)-X^1 \quad (19c)$$

where m is an integer of not less than 0, $$CF_2=CFOCF(CF_3)CF_2O(CF_2)_n-X^1 \quad (20c)$$

where n is an integer of not less than 1, $$CF_2=CFOCF_2OCF_2CF(CF_3)OCF_2-X^1 \quad (21c), and$$

$$CH_2=CH-(CF_2)_nX^1 \quad (22c)$$

where n is an integer of 2 to 8,
(in the formulas (5c) to (22c), $X^1$ is as defined in the formula (3c)),
and these can be used alone or can be used in an optional combination thereof.

Preferred examples of the iodine- or bromine-containing monomer represented by the formula (4c) are iodine-containing fluorinated vinyl ethers represented by the formula (23):

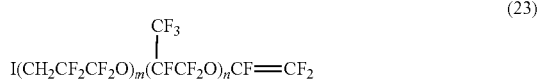

$$I(CH_2CF_2CF_2O)_m(\overset{CF_3}{\underset{|}{C}}FCF_2O)_nCF=CF_2 \quad (23)$$

where m is an integer of 1 to 5, n is 0 or an integer of 1 to 3, and specifically there are $$ICH_2CF_2CF_2OCF=CF_2, \quad I(CH_2CF_2CF_2O)_2CF=CF_2,$$

$$I(CH_2CF_2CF_2O)_3CF=CF_2,$$

$$ICH_2CF_2CF_2O\overset{CF_3}{\underset{|}{C}}FCF_2OCF=CF_2,$$

$$ICH_2CF_2CF_2O(\overset{CF_3}{\underset{|}{C}}FCF_2O)_2CF=CF_2$$

and the like, and among these, $ICH_2CF_2CF_2OCF=CF_2$ is preferred.

More specifically, preferred examples of the iodine-containing monomer or bromine-containing monomer represented by the formula (5c) are $ICF_2CF_2CF=CH_2$ and $I(CF_2CF_2)_2CF=CH_2$.

More specifically, preferred example of the iodine-containing monomer or bromine-containing monomer represented by the formula (9c) is $I(CF_2CF_2)2OCF=CF_2$.

More specifically, preferred examples of the iodine-containing monomer or bromine-containing monomer represented by the formula (22c) are $CH_2=CHCF_2CF_2I$ and $I(CF_2CF_2)_2CH=CH_2$.

Among the compounds represented by the above-mentioned formulas (4c) to (22c), monomers having $X^1$ of cyano group (—CN group), carboxyl group (—COOH group) or alkoxycarbonyl group (—COOR group, where R is an alkyl group which has 1 to 10 carbon atoms and may have fluorine atom) may be used together with the compound represented by the general formula (1).

When structural units derived from these iodine (bromine) atom-containing monomers are contained, the amount thereof is preferably not less than 2% by mole and not more than 10% by mole based on the total number of moles of such structural units and repeat units derived from other comonomers.

It is preferable that the above-mentioned ethylenically unsaturated monomer comprising fluoroolefin comprises a structural unit derived from at least one monomer selected from the group consisting of tetrafluoroethylene, vinylidene fluoride and the perfluoro ethylenically unsaturated compound represented by the formula (1):

$$CF_2=CF-R_f^1 \quad (1)$$

wherein $R_f^1$ is —$CF_3$ or —$OR_f^2$, where $R_f^2$ is a perfluoroalkyl group having 1 to 5 carbon atoms, from the point that particles having properties of an elastic rubber can be obtained.

In the fluorine-containing elastomer (a3), an elastomer portion other than the structural unit derived from the iodine atom- or bromine atom-containing monomer of the formula (3c) is preferably a crosslinkable fluorine-containing rubber, and the fluorine-containing rubber is preferably non-perfluoro fluorine-containing rubber (a3-1) and perfluoro fluorine-containing rubber (a3-2).

Examples of the non-perfluoro fluorine-containing rubber (a3-1) are vinylidene fluoride (VdF) type fluorine-containing rubbers, tetrafluoroethylene (TFE)/propylene type fluorine-containing rubbers, tetrafluoroethylene (TFE)/propylene/vinylidene fluoride (VdF) type fluorine-containing rubbers, ethylene/hexafluoropropylene (HFP) type fluorine-containing rubbers, ethylene/hexafluoropropylene (HFP)/vinylidene fluoride (VdF) type fluorine-containing rubbers, ethylene/hexafluoropropylene (HFP)/tetrafluoroethylene (TFE) type fluorine-containing rubbers, fluorosilicone type fluorine-containing rubbers, fluorophosphazene type fluorine-containing rubbers, and the like. Those rubbers can be used alone or can be used in an optional combination thereof to such an extent not to impair the effect of the present invention. Among these, vinylidene fluoride type fluorine-containing rubbers and tetrafluoroethylene/propylene type fluorine-containing rubbers are more suitable.

Specifically, in the above-mentioned VdF type rubbers, the amount of VdF repeat units is preferably not less than 20% by mole and not more than 90% by mole, more preferably not less than 40% by mole and not more than 85% by mole based on the total number of moles of the VdF repeat units and the repeat units derived from other comonomers in the above-mentioned VdF type elastomer. Further, a preferred lower limit is 45% by mole, especially preferably 50% by mole, and a preferred upper limit is 80% by mole.

Other monomers in the above-mentioned VdF type rubber are not limited particularly as far as they are copolymerizable with VdF. Examples thereof are fluorine-containing monomers such as TFE, HFP, PAVE, CTFE, trifluoroethylene, trifluoropropylene, tetrafluoropropylene, pentafluoropropylene, trifluorobutene, tetrafluoroisobutene, vinyl fluoride and iodine-containing fluorinated vinyl ether; and non-fluorine-containing monomers such as ethylene (Et), propylene (Pr) and alkyl vinyl ether. Among these fluorine-containing monomers and non-fluorine-containing monomers, one kind can be used or two or more kinds can be used in combination. Preferred examples of the above-mentioned PAVE are perfluoro (methyl vinyl ether) and perfluoro(propyl vinyl ether), and especially perfluoro(methyl vinyl ether) is preferred.

Preferred examples of the above-mentioned VdF type rubbers are a VdF/HFP copolymer, a VdF/HFP/TFE copolymer, a VdF/CTFE copolymer, a VdF/CTFE/TFE copolymer, a VdF/PAVE copolymer, a VdF/TFE/PAVE copolymer, a VdF/HFP/PAVE copolymer, a VdF/HFP/TFE/PAVE copolymer, a VdF/TFE/Pr copolymer, and a VdF/Et/HFP copolymer, and examples of more preferred other monomer are ones comprising TFE, HFP and/or PAVE, and especially preferred are a VdF/HFP copolymer, a VdF/HFP/TFE copolymer, a VdF/PAVE copolymer, a VdF/TFE/PAVE copolymer, a VdF/HFP/PAVE copolymer and a VdF/HFP/TFE/PAVE copolymer.

In the VdF/HFP copolymer, a ratio of VdF/HFP is preferably 45 to 85/55 to 15 (molar percent), more preferably 50 to 80/50 to 20 (molar percent), further preferably 60 to 80/40 to 20 (molar percent).

A preferred VdF/HFP/TFE copolymer is one comprising VdF/HFP/TFE in a ratio of 40 to 80/10 to 35/10 to 25 (molar percent).

A preferred VdF/PAVE copolymer is one comprising VdF/PAVE in a ratio of 65 to 90/10 to 35 (molar percent).

A preferred VdF/TFE/PAVE copolymer is one comprising VdF/TFE/PAVE in a ratio of 40 to 80/3 to 40/15 to 35 (molar percent).

A preferred VdF/HFP/PAVE copolymer is one comprising VdF/HFP/PAVE in a ratio of 65 to 90/3 to 25/3 to 25 (molar percent).

A preferred VdF/HFP/TFE/PAVE copolymer is one comprising VdF/HFP/TFE/PAVE in a ratio of 40 to 90/0 to 25/0 to 40/3 to 35 (molar percent), more preferably one comprising VdF/HFP/TFE/PAVE in a ratio of 40 to 80/3 to 25/3 to 40/3 to 25 (molar percent).

Tetrafluoroethylene/propylene type fluorine-containing rubbers are fluorine-containing copolymers comprising 45 to 70% by mole of tetrafluoroethylene and 55 to 30% by mole of propylene. In addition to these two components, a specific third component (for example, PAVE) may be contained in an amount of 0 to 40% by mole.

Examples of the perfluoro fluorine-containing rubber (a3-2) are ones comprising TFE/PAVE. A ratio of TFE/PAVE is preferably 50 to 90/50 to 10 in molar percent, more preferably 50 to 80/50 to 20 in molar percent, further preferably 55 to 70/45 to 30 in molar percent.

In this case, examples of the PAVE are perfluoro(methyl vinyl ether), perfluoro(propyl vinyl ether) and the like, and these can be used alone or can be used in an optional combination thereof.

Preferred examples of the fluorine-containing elastomer (a3) are peroxide crosslinkable fluorine-containing rubbers, and specifically it is preferable that the fluorine-containing elastomer (a3) contains iodine atom and/or bromine atom (preferably iodine atom) in an amount of 0.01 to 10% by mass, more preferably 0.05 to 2% by mass. When the amount is less than 0.01% by mass, there is a tendency that crosslinking is insufficient, thereby lowering compression set, and when the amount exceeds 10% by mass, there is a tendency that crosslinking density becomes too high, thereby lowering rubber performance, for example, elongation becomes too small.

Examples of a process for preparing the fluorine-containing elastomer (a3) are a process for copolymerizing a monomer providing the above-mentioned non-perfluoro fluorine-containing rubber (a3-1) or perfluoro fluorine-containing rubber (a3-2) with the iodine (bromine) atom-containing monomer (3c) (which is also called a monomer providing a peroxide-crosslinkable cure site), and a process for polymerizing these monomers by iodine (bromine) transfer polymerization explained infra.

For iodine (bromine) transfer polymerization, for example, there is exemplified a method of carrying out emulsion polymerization of the above-mentioned monomer constituting the fluorine-containing elastomer (a3) and, if necessary, a monomer providing peroxide-crosslinkable cure site in the presence of an iodine compound, preferably a diiodine compound with stirring under pressure in the presence of a radical initiator in an aqueous medium substantially in the absence of oxygen. A representative example of the diiodine compound to be used is a compound represented by the formula (2c):

$$R^2 I_x Br_y \qquad (2c)$$

wherein each of x and y is an integer of 0 to 2, and satisfies $1 \leq x+y \leq 2$, $R^2$ is a saturated or unsaturated fluorohydrocarbon group or chlorofluorohydrocarbon group having 1 to 16 carbon atoms, or a hydrocarbon group having 1 to 3 carbon atoms, and may contain an oxygen atom. The so-introduced iodine atom or bromine atom functions as peroxide-crosslinkable cure site.

Examples of the compound represented by the formula (2c) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and monoiodo-monobromo-substituted product, diiodo-monobromo-substituted product, and (2-iodoethyl)- or (2-bromoethyl)-substituted product of benzene. These compounds may be used alone, or can be used in combination thereof.

In these compounds, 1,4-diiodoperfluorobutane and diiodomethane are preferred from the viewpoint of polymerization reactivity, crosslinking reactivity and availability.

In the case where the fluorine-containing elastomer (a3) is a fluorine-containing rubber, the amount of diiodine compound is preferably 0.0001 to 5% by mass based on the total amount of a fluorine-containing rubber.

The fluorine content of the fluorine-containing elastomer (a3) constituting the fluorine-containing elastomer particles (A3) may be optionally selected depending on purpose of the use, and is preferably not less than 65%. by mass, further preferably not less than 70% by mass, from the viewpoint of improvement in composite dispersibility with a fluorine-containing resin in the case of using a fluorine-containing resin as the synthetic resin (E). Also, from the viewpoint of efficiently advancing peroxide crosslinking, a fluorine-containing elastomer having an iodine atom, especially preferably three iodine atoms per one polymer molecule at an end thereof is preferred.

The crosslinking reaction of the fluorine-containing elastomer particles (A3) is carried out by the peroxide crosslinking explained infra in the sixth invention or usual peroxide crosslinking, or the crosslinking may be initiated by irradiation of active energy rays such as ultraviolet rays and radiation at normal temperature, and in this case, a crosslinking auxiliary, a sensitizer or the like may be used together.

In addition, peroxide crosslinking reaction and crosslinking reaction with active energy rays may be employed together. Also, an embodiment essentially employing crosslinking reaction with active energy rays is one of suitable embodiments, that is, a process for preparing crosslinked fluorine-containing elastomer fine particles by irradiating the aqueous dispersion comprising the fluorine-containing elastomer particles (A3) and the polyfunctional unsaturated compound with active energy rays at normal temperature to crosslink the fluorine-containing elastomer particles (A3) with active energy rays.

In addition, the following crosslinking embodiments can be employed.
(i) A method of undergoing crosslinking during the polymerization by adding a monomer having two or more ethylenic unsaturated groups during the polymerization.
(ii) A method of undergoing polyol crosslinking with bisphenol AF, acid acceptor, onium salt, or the like.
(iii) A method of undergoing amine crosslinking with amine crosslinking agent, acid acceptor, or the like.

After completion of the crosslinking reaction, the obtained crosslinked fluorine-containing elastomer fine particles (D3) can be separated and recovered by a method such as a freeze coagulation method, a salting-out method, an acid coagulation method or the like method. Among these, a freeze coagulation method is preferred from the viewpoint of satisfactory shape of particles after the coagulation.

An average particle size of the crosslinked fluorine-containing elastomer fine particles (D3) is preferably 0.01 to 0.5 μm from the viewpoint of improvement in composite dispersibility with the synthetic resin (E), especially a fluorine-containing resin and improvement in physical properties. The average particle size is further preferably not more than 0.3 μm, especially not more than 0.2 μm, and not less than 0.05 μm, especially not less than 0.1 μm.

The fluorine content of the crosslinked fluorine-containing elastomer fine particles (D3) is preferably not less than 65% by mass, further preferably not less than 70% by mass, from the viewpoint of improvement in composite dispersibility with a fluorine-containing resin in the case of using a fluorine-containing resin as the synthetic resin (E).

The fifth invention of the present invention relates to the composition comprising the crosslinked fluorine-containing elastomer fine particles (D3) and the synthetic resin (E).

The synthetic resin (E) may be, for example, a curable resin, and from the viewpoint making the best use of characteristics of the crosslinked fluorine-containing elastomer fine particles (D3) as an elastomer, a thermoplastic resin is preferred.

Examples of a thermoplastic resin are fluorine-containing resin, polyethylene, polypropylene, polyvinyl chloride, polyvinylidene chloride, polystyrene, polyvinyl acetate, acrylonitrile-butadiene-styrene resin, acrylic resin, polyamide, polyacetal, polycarbonate, polybutylene terephthalate, polyethylene terephthalate, polyphenylene sulfide, polysulphone, polyether sulphone, polyether ether ketone, polyimide, and polyamide imide.

A fluorine-containing resin is not limited particularly, and is preferably a fluorine-containing resin comprising at least one fluorine-containing ethylenic polymer. It is preferable that the fluorine-containing ethylenic polymer has a structural unit derived from at least one fluorine-containing ethylenic monomer. Examples of the fluorine-containing ethylenic monomer are perfluoroolefins such as tetrafluoroethylene (TFE) and perfluoro ethylenically unsaturated compounds represented by the formula (1):

$$CF_2=CF-R_f^1 \qquad (1)$$

wherein $R_f^1$ is $-CF_3$ and/or $-OR_f^2$, where $R_f^2$ is a perfluoroalkyl group having 1 to 5 carbon atoms; and fluoroolefins such as chlorotrifluoroethylene (CTFE), trifluoroethylene, hexafluoroisobutene, vinylidene fluoride (VdF), vinyl fluoride and compounds of the formula:

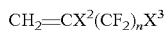

$$CH_2=CX^2(CF_2)_nX^3$$

wherein $X^2$ represents hydrogen atom or fluorine atom, $X^3$ represents hydrogen atom, fluorine atom or chlorine atom, n is an integer of 1 to 10.

The fluorine-containing ethylenic polymer may contain a structural unit derived from a monomer being copolymerizable with the above-mentioned fluorine-containing ethylenic monomer, and examples of such a monomer are non-fluorine-containing ethylenic monomers other than the above-mentioned fluoroolefins and perfluoroolefins. Examples of non-fluorine-containing ethylenic monomers are ethylene, propylene and alkyl vinyl ethers. Here, these alkyl vinyl ethers are alkyl vinyl ethers having an alkyl group having 1 to 5 carbon atoms.

Among these, from the viewpoint of satisfactory heat resistance, chemical resistance and oil resistance of the obtained fluorine-containing resin composition and easy mold-processing, polymers of the following (1) to (5) can be exemplified as especially preferred fluorine-containing ethylenic polymer. The fluorine-containing ethylenic polymer is not limited to them and may be selected depending on purpose and application.
(1) Ethylene-TFE copolymer comprising ethylene and TFE (hereinafter also referred to as ETFE)
(2) TFE-PAVE copolymer (PFA) or TFE-HFP copolymer (FEP) comprising TFE and a perfluoro ethylenically unsaturated compound represented by the formula (1):

$$CF_2=CF-R_f^1 \qquad (1)$$

wherein $R_f^1$ is $-CF_3$ and/or $-OR_f^2$, where $R_f^2$ is a perfluoroalkyl group having 1 to 5 carbon atoms
(3) Ethylene-TFE-HFP copolymer or copolymer of ethylene-TFE-perfluoro ethylenically unsaturated compound comprising TFE, ethylene and the perfluoro ethylenically unsaturated compound represented by the above-mentioned formula (1)
(4) Polyvinylidene fluoride (PVDF)
(5) Copolymer of CTFE-TFE-perfluoro ethylenically unsaturated compound comprising CTFE, TFE and the perfluoro ethylenically unsaturated compound represented by the above-mentioned formula (1)
Any of these polymers are preferred, and the fluorine-containing ethylenic polymers represented by (1), (2) and (5) are preferred.

Next, the preferred fluorine-containing ethylenic polymers of (1), (2) and (5) are explained below more specifically.
(1) ETFE ETFE is preferred since dynamic physical properties and fuel-barrier property in addition to the above-mentioned functions and effects are exhibited. A molar ratio of a TFE unit to an ethylene unit is preferably 20:80 to 90:10, more preferably 38:62 to 85:15, especially preferably 37:63 to 80:20. Also, ETFE may contain a third component, and kind of the third component is not limited as far as it is copolymerizable with TFE and ethylene. Usually monomers represented by the formulas:

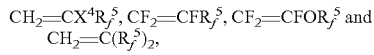
$$CH_2\!\!=\!\!CX^4R_f^5, CF_2\!\!=\!\!CFR_f^5, CF_2\!\!=\!\!CFOR_f^5 \text{ and}$$
$$CH_2\!\!=\!\!C(R_f^5)_2,$$

wherein $X^4$ is hydrogen atom or fluorine atom, $R_f^5$ is a fluoroalkyl group which may contain ether linkage-formable oxygen atom, are used as the third component. Among these, fluorine-containing vinyl monomers represented by $CH_2\!\!=\!\!CX^4R_f^5$ are more preferred, and monomers having $R_f^5$ having 1 to 8 carbon atoms are especially preferred.

Examples of the fluorine-containing vinyl monomer represented by the above-mentioned formula are 1,1-dihydroperfluoropropene-1, 1,1-dihydroperfluorobutene-1, 1,1,5-trihydroperfluoropentene-1, 1,1,7-trihydroperfluoroheptene-1, 1,1,2-trihydroperfluorohexene-1, 1,1,2-trihydroperfluorooctene-1, 2,2,3,3,4,4,5,5-octafluoropentyl vinyl ether, perfluoro(methyl vinyl ether), perfluoro(propyl vinyl ether), hexafluoropropene, perfluorobutene-1,3,3,3-trifluoro-2-(trifluoromethyl)propene-1 and 2,3,3,4,4,5,5-heptafluoro-1-pentene ($CH_2\!\!=\!\!CFCF_2CF_2CF_2H$).

The amount of third component is preferably 0.1 to 10% by mole, more preferably 0.1 to 5% by mole, especially preferably 0.2 to 4% by mole based on the fluorine-containing ethylenic polymer.

(2) PFA or FEP

PFA or FEP is preferred since among the above-mentioned functions and effects, especially heat resistance is excellent and satisfactory fuel barrier property is exhibited in addition to the above-mentioned functions and effects. Nonlimiting example thereof is preferably a copolymer comprising 70 to 99% by mole of the TFE unit and 1 to 30% by mole of the perfluoro ethylenically unsaturated compound unit represented by the formula (1), and is more preferably a copolymer comprising 80 to 97% by mole of the TFE unit and 3 to 20% by mole of the perfluoro ethylenically unsaturated compound unit represented by the formula (1). When the amount of TFE unit is less than 70% by mole, mechanical properties tend to be lowered, and when the amount of TFE unit exceeds 99% by mole, there is a tendency that a melting point becomes too high and moldability is lowered. Also, the fluorine-containing ethylenic polymer comprising TFE and the perfluoro ethylenically unsaturated compound represented by the formula (1) may contain a third component, and kind of the third component is not limited as far as it is copolymerizable with TFE and the perfluoro ethylenically unsaturated compound represented by the formula (1).

(5) CTFE-TFE Copolymer

In the case of a CTFE-TFE copolymer, a molar ratio of a CTFE unit to a TFE unit is preferably 2:98 to 98:2, more preferably 5:95 to 90:10. When the amount of CTFE unit is less than 2% by mole, there is a tendency that permeability of chemicals is lowered and melt-processing becomes difficult, and when the amount of CTFE unit exceeds 98% by mole, there is a case where heat resistance and chemical resistance at molding are lowered. Also, it is preferable to copolymerize the perfluoro ethylenically unsaturated compound, and the amount of perfluoro ethylenically unsaturated compound unit is preferably 0.1 to 10% by mole based on the total amount of CTFE unit and TFE unit, and the total amount of CTFE unit and TFE unit is preferably 90 to 99.9% by mole. When the amount of perfluoro ethylenically unsaturated compound unit is less than 0.1% by mole, moldability, resistance to environmental stress cracking and resistance to stress cracking are liable to be inferior, and when the amount exceeds 10% by mole, low permeability of chemicals, heat resistance, mechanical properties and productivity tend to be inferior.

A mixing ratio of the crosslinked fluorine-containing elastomer fine particles (D3) to the synthetic resin (E), especially a fluorine-containing resin is preferably 0.1/99.9 to 25/75, further preferably 0.5/99.5 to 25/75, especially preferably 1/99 to 20/80 in a mass ratio ((D3)/(E)). A too large proportion of the crosslinked fluorine-containing elastomer fine particles (D3) is not preferred because strength at break of the composition is decreased excessively and fuel barrier property is lowered.

The composition comprising the crosslinked fluorine-containing elastomer fine particles (D3) and a fluorine-containing resin exhibits excellent performance when used as a fuel hose, a dynamic sealing material and a soft resin.

When preparing a composition for a fuel hose, it is preferable to use FEP, PFA and ETFE as a fluorine-containing resin, and in this case, a mass ratio of the crosslinked fluorine-containing elastomer fine particles (D3) to the fluorine-containing resin is preferably 0.1/99.9 to 25/75, further preferably 0.5/99.5 to 25/75, especially preferably 1/99 to 20/80 since especially fuel barrier property is enhanced.

When preparing a composition for a dynamic sealing material, it is preferable to use FEP, PFA and ETFE as a fluorine-containing resin, and in this case, a mass ratio of the crosslinked fluorine-containing elastomer fine particles (D3) to the fluorine-containing resin is preferably 0.1/99.9 to 25/75, further preferably 0.5/99.5 to 25/75, more preferably 1/99 to 25/75, especially preferably 5/95 to 20/80 since flexibility and sealing property are satisfactory.

When preparing a composition for a soft resin, it is preferable to use FEP, PFA and ETFE as a fluorine-containing resin, and in this case, a mass ratio of the crosslinked fluorine-containing elastomer fine particles (D3) to the fluorine-containing resin is preferably 0.1/99.9 to 25/75, further preferably 0.5/99.5 to 25/75, more preferably 1/99 to 25/75, especially preferably 5/95 to 20/80 from the viewpoint of low elastic modulus.

The composition comprising the crosslinked fluorine-containing elastomer fine particles (D3) and the synthetic resin (E) may be prepared by a dry blend method using a mixer such as a banbury mixer or a rotary stirrer, or a homogeneous composition may be prepared by mixing an aqueous dispersion (aqueous dispersion after crosslinking) of the crosslinked fluorine-containing elastomer fine particles (D3) with an aqueous dispersion of the synthetic resin (E) fine particles and then co-coagulating the mixture. From the viewpoint of satisfactory dispersibility of the crosslinked fluorine-containing elastomer fine particles (D3), especially a co-coagulation method is preferred.

The crosslinked fluorine-containing elastomer fine particles (D3) may be blended in the form of powder or in the form of aqueous dispersion depending on application and kind of the synthetic resin (E).

In the fifth invention, especially in the field where neither high purity nor non-contaminating property is demanded, it is possible to blend usual additives, for example, filler, processing aid, plasticizer, coloring agent and the like which are blended to resin compositions according to necessity, and one or more usual crosslinking agent and crosslinking auxiliary may be blended.

The sixth invention relates to the process for preparing crosslinked fluorine-containing elastomer fine particles by subjecting the peroxide-crosslinkable fluorine-containing elastomer particles (A4) to peroxide-crosslinking by heating an aqueous dispersion comprising the fluorine-containing elastomer particles (A4) in the presence of the peroxide (B) and the polyfunctional unsaturated compound (C).

A suitable example of the fluorine-containing elastomer (a4) constituting the peroxide-crosslinkable fluorine-containing elastomer particles (A4) to be used in the sixth invention is a peroxide-crosslinkable fluorine-containing rubber, and it is preferable that the elastomer comprises a structural unit derived from at least one monomer selected from the group consisting of tetrafluoroethylene, vinylidene fluoride and a perfluoro ethylenically unsaturated compound represented by the formula (1):

$$CF_2=CF-R_f^1 \quad (1)$$

wherein $R_f^1$ is $-CF_3$ or $-OR_f^2$, where $R_f^2$ is a perfluoroalkyl group having 1 to 5 carbon atoms, from the point that particles having properties of an elastic rubber can be obtained.

Peroxide-crosslinkable non-perfluoro fluorine-containing rubber (a4-1) and peroxide-crosslinkable perfluoro fluorine-containing rubber (a4-2) are preferred as the peroxide-crosslinkable fluorine-containing rubber.

Examples of the non-perfluoro fluorine-containing rubber (a4-1) are vinylidene fluoride (VdF) type fluorine-containing rubbers, tetrafluoroethylene (TFE)/propylene type fluorine-containing rubbers, tetrafluoroethylene (TFE)/propylene/vinylidene fluoride (VdF) type fluorine-containing rubbers, ethylene/hexafluoropropylene (HFP) type fluorine-containing rubbers, ethylene/hexafluoropropylene (HFP)/vinylidene fluoride (VdF) type fluorine-containing rubbers, ethylene/hexafluoropropylene (HFP)/tetrafluoroethylene (TFE) type fluorine-containing rubbers, fluorosilicone type fluorine-containing rubbers, fluorophosphazene type fluorine-containing rubbers, and the like. These rubbers can be used alone or can be used in an optional combination thereof to such an extent not to impair the effect of the present invention. Among these, vinylidene fluoride type fluorine-containing rubbers and tetrafluoroethylene/propylene type fluorine-containing rubbers are more suitable.

The vinylidene fluoride type fluorine-containing rubbers are fluorine-containing copolymers comprising 45 to 85% by mole of vinylidene fluoride and 55 to 15% by mole of at least one other monomer being copolymerizable with vinylidene fluoride. The vinylidene fluoride type fluorine-containing rubbers are preferably fluorine-containing copolymers comprising 50 to 80% by mole of vinylidene fluoride and 50 to 20% by mole of at least one other monomer being copolymerizable with vinylidene fluoride.

Examples of at least one other monomer being copolymerizable with vinylidene fluoride are fluorine-containing monomers such as tetrafluoroethylene (TFE), chlorotrifluoroethylene (CTFE), trifluoroethylene, hexafluoro propylene (HFP), trifluoropropylene, tetrafluoropropylene, pentafluoropropylene, trifluorobutene, tetrafluoroisobutene, perfluoro(alkyl vinyl ether) (PAVE) and vinyl fluoride; and non-fluorine-containing monomers such as ethylene, propylene and alkyl vinyl ether. These monomers can be used alone or can be used in optional combination thereof. Among these, tetrafluoroethylene, hexafluoropropylene and perfluoro(alkyl vinyl ether) are preferred.

Examples of the rubber are VdF/HFP type rubbers, VdF/HFP/TFE type rubbers, VdF/CTFE type rubbers and VdF/CTFE/TFE type rubbers.

Tetrafluoroethylene/propylene type fluorine-containing rubbers are fluorine-containing copolymers comprising 45 to 70% by mole of tetrafluoroethylene, 55 to 30% by mole of propylene and not more than 5% by mole of a monomer providing a peroxide-crosslinkable cure site based on the total amount of tetrafluoroethylene and propylene.

Examples of a monomer providing a peroxide-crosslinkable cure site are iodine- or bromine-containing monomers represented by the formula (24):

$$CX^1{}_2=CX^1-R_f^1CHR^1X^2 \quad (24)$$

wherein $X^1$ are H, F or $CH_3$; $R_f^1$ is a fluoroalkylene group, a perfluoroalkylene group, a fluoropolyoxyalkylene group or a perfluoropolyoxyalkylene group; $R^1$ is H or $CH_3$; $X^2$ is iodine atom or bromine atom, and monomers represented by the formula (25):

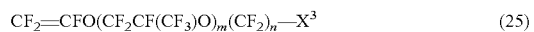
$$CF_2=CFO(CF_2CF(CF_3)O)_m(CF_2)_n-X^3 \quad (25)$$

wherein m is 0 or an integer of 1 to 5; n is an integer of 1 to 3; $X^3$ is bromine atom. In addition, there are iodine-containing monomers such as perfluoro(6,6-dihydro-6-iodo-3-oxa-1-hexene) and perfluoro(5-iodo-3-oxa-1-pentene) described in JPS-63482B and JP7-316234A, and these monomers can be used alone or can be used in optional combination thereof.

These non-perfluoro fluorine-containing rubbers (a4-1) can be prepared by usual processes.

Examples of the perfluoro fluorine-containing rubber (a4-2) are ones comprising tetrafluoroethylene/perfluoro(alkyl vinyl ether)/monomer providing a peroxide-crosslinkable cure site. The ratio of tetrafluoroethylene/perfluoro(alkyl vinyl ether) is preferably 50/90 to 50/10 in molar percent, more preferably 50/80 to 50/20 in molar percent, further preferably 55/70 to 45/30 in molar percent. The amount of monomer providing a peroxide-crosslinkable cure site is preferably not more than 5% by mole, more preferably not more than 2% by mole based on the total amount of tetrafluoroethylene and perfluoro(alkyl vinyl ether). When the proportions thereof are beyond the above-mentioned range, there is a tendency that properties of an elastic rubber are lost and become akin to those of a resin.

In this case, examples of perfluoro(alkyl vinyl ether) are perfluoro(methyl vinyl ether), perfluoro(propyl vinyl ether) and the like, and these can be used alone or can be used in optional combination thereof.

Examples of a monomer providing a peroxide-crosslinkable cure site are iodine- or bromine-containing monomers represented by the above-mentioned formula (24) and the monomers represented by the above-mentioned formula (25), and in addition, there are iodine-containing monomers such as perfluoro(6,6-dihydro-6-iodo-3-oxa-1-hexene) and perfluoro(5-iodo-3-oxa-1-pentene) described in JP5-634828 and JP7-316234A, and these monomers can be used alone or can be used in optional combination thereof.

These perfluoro fluorine-containing rubbers (a4-2) can be prepared by usual processes.

Examples of the perfluoro fluorine-containing rubber (a4-2) are fluorine-containing rubbers described in WO 97/24381, JP61-57324B, JP4-81608B and JP5-13961B.

Example of a preferred process for preparing the fluorine-containing elastomer (a4) is an iodine transfer polymerization method known as a process for preparing fluorine-containing rubbers. For example, there is exemplified a method of carrying out emulsion polymerization of the above-mentioned monomers constituting the fluorine-containing elastomer (a4) and, if necessary, a monomer providing peroxide-crosslinkable cure site in the presence of a radical initiator with stirring under pressure in the presence of an iodine compound, preferably a diiodine compound in an aqueous medium substantially in the absence of oxygen. A representative example of the diiodine compound to be used is a compound represented by:

$$R^2I_xBr_y \quad (26)$$

wherein each of x and y is an integer of 0 to 2, and satisfies $1 \leq x+y \leq 2$, $R^2$ is a saturated or unsaturated fluorohydrocarbon group or chlorofluorohydrocarbon group having 1 to 16 carbon atoms, or a hydrocarbon group having 1 to 3 carbon atoms, and may contain an oxygen atom. The so-introduced iodine atom or bromine atom functions as peroxide-crosslinkable cure site.

Examples of the compound represented by the formula (26) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFC_1Br$, $CFBrClCFCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluoro butene-1, and monoiodo-monobromo-substituted product, diiodo-monobromo-substituted product, and (2-iodoethyl)- or (2-bromoethyl)-substituted product of benzene. These compounds may be used alone, or can be used in combination thereof.

In these compounds, 1,4-diiodoperfluorobutane and diiodomethane are preferred from the viewpoint of polymerization reactivity, crosslinking reactivity and availability.

In the case where the fluorine-containing elastomer (a4) is a fluorine-containing rubber, the amount of diiodine compound is preferably 0.0001 to 5% by mass based on the total amount of a fluorine-containing rubber.

The fluorine content of the fluorine-containing elastomer (a4) constituting the fluorine-containing elastomer particles (A4) may be optionally selected depending on purpose of the use, and is preferably not less than 65% by mass, further preferably not less than 70% by mass, from the viewpoint of improvement in composite dispersibility with a fluorine-containing resin. Also, from the viewpoint of peroxide crosslinking, an elastomer having an iodine group at a polymer end is preferred.

An average particle size of the fluorine-containing elastomer particles (A4) is preferably 0.01 to 0.5 μm from the viewpoint of improvement in composite dispersibility with the synthetic resin, especially a fluorine-containing resin and improvement in physical properties. The average particle size is further preferably not more than 0.3 μm, especially preferably not more than 0.2 μm, and not less than 0.05 μm, especially preferably not less than 0.1 μm.

In the present invention, in order to initiate the peroxide crosslinking, the peroxide (B) is used as a crosslinking agent and any of persulfate (B1) and organic peroxide (B2) may be used and both of them may be used together.

Examples of the persulfate (B1) are ammonium persulfate (APS), sodium persulfate (SPS) and potassium persulfate (KPS). Among these, APS is preferred from the viewpoint of suitable half-life temperature and satisfactory crosslinking efficiency. Also, the persulfate (B1) can be used in combination with a reducing agent such as sulfite.

Examples of the organic peroxide (B2) are 1,1-bis(t-butylperoxy)-3,5,5-trimethylcyclohexane, 2,5-dimethylhexane-2,5-dihydro peroxide, di-t-butyl peroxide, t-butylcumyl peroxide, dicumyl peroxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexine-3,benzoyl peroxide, t-butyl peroxybenzene, 2,5-dimethyl-2,5-di(benzoylperoxy)-hexane, t-butyl peroxymaleate, t-butylperoxy isopropylcarbonate, t-butylperoxy-2-ethylhexanoate, t-hexylperoxy-2-ethylhexanoate, 2,5-dimethyl-2,5-di(2-ethylhexanoylperoxy)hexane and the like. Among them, dialkyl type peroxides are preferred. Particularly t-butylperoxy-2-ethylhexanoate is preferred. Generally, kind and an amount of the organic peroxide are selected in consideration of an amount of an active —O—O— and a decomposition temperature. From the viewpoint of half-life temperature and satisfactory crosslinking efficiency, t-butylperoxy-2-ethylhexanoate, t-hexylperoxy-2-ethylhexanoate and 2,5-dimethyl-2,5-di(2-ethylhexanoylperoxy)hexane are preferred.

Among these peroxides (B), the persulfate (B1) is preferred from the viewpoint of satisfactory crosslinking efficiency, and APS and KPS are especially preferred from the viewpoint of satisfactory crosslinking efficiency.

The amount of peroxide (B) is preferably 0.1 to 20 parts by mass based on 100 parts by mass of the fluorine-containing elastomer particles (A4) in the aqueous dispersion from the viewpoint of satisfactory crosslinking efficiency. The amount is further preferably not more than 10 parts by mass, especially not more than 5 parts by mass and not less than 0.1 part by mass, especially not less than 1.0 part by mass based on 100 parts by mass of the fluorine-containing elastomer particles (A4) in the aqueous dispersion.

The polyfunctional unsaturated compound (C) is not limited particularly as far as it is a polyfunctional unsaturated compound being capable of acting as a crosslinking auxiliary in the peroxide crosslinking in the aqueous dispersion. Examples thereof are polyfunctional compounds having a functional group such as $CH_2=CH-$, $CH_2=CHCH_2-$, $CF_2=CF-$ or $-CH=CH-$.

Preferred example thereof is at least one compound selected from the group consisting of oxime-nitroso compounds, di(meth)acrylate compounds, triester compounds, triallyl isocyanurate compounds and polybutadiene compounds.

Examples of oxime-nitroso compound are dinitrosobenzene and the like.

Examples of di(meth)acrylate compound are NK ESTER 9G (available from Shin-Nakamura Chemical Co., Ltd.) and the like.

Examples of triester compound are Hi-Cross M (available from Seiko Chemical Co., Ltd.), NK ESTER TMTP (available from Shin-Nakamura Chemical Co., Ltd.) and the like.

Examples of triallyl isocyanurate compound are triallyl isocyanurate (TAIC), trimethallyl isocyanurate (TMAIC) and the like.

Examples of polybutadiene compound are NISSO-PB (available from Nippon Soda Co., Ltd.) and the like.

Among these, triallyl isocyanurate (TAIC) can be used preferably from the viewpoint of satisfactory crosslinking efficiency.

The amount of polyfunctional unsaturated compound (C) is preferably 0.1 to 20 parts by mass based on 100 parts by mass of the fluorine-containing elastomer particles (A4) in the aqueous dispersion from the viewpoint of satisfactory crosslinking efficiency. The amount is further preferably not more than 10 parts by mass, especially not more than 5 parts by mass and not less than 0.5 part by mass, especially not less than 1.0 part by mass based on 100 parts by mass of the fluorine-containing elastomer particles (A4) in the aqueous dispersion.

In the preparation process of the present invention, the aqueous dispersion comprising the peroxide-crosslinkable fluorine-containing elastomer particles (A4), the peroxide (B) and the polyfunctional unsaturated compound (C) is prepared.

The aqueous dispersion can be prepared by (I) a method of pouring the fluorine-containing elastomer particles (A4) in an aqueous medium, adding thereto the peroxide (B) and the polyfunctional unsaturated compound (C) and carrying out stirring and dispersing; or (II) a method of adding the peroxide (B) and the polyfunctional unsaturated compound (C) to the aqueous dispersion (aqueous dispersion just after polymerization) containing the fluorine-containing elastomer particles (A4) which is a polymerization product obtained by iodine transfer polymerization method and, and then conducting stirring and dispersing to suitably adjust its concentration.

In the preparation method (I), the dispersion may be stabilized by using a surfactant. However, from the viewpoint of stability at crosslinking, its amount is preferably not more than 5 parts by mass, further preferably not more than 1 part by mass based on 100 parts by mass of the fluorine-containing elastomer particles (A4).

Examples of usable surfactant are $C_7F_{15}COONH_4$, $C_3F_7O(CF(CF_3)CF_2O)CFCF_3COONH_4$ and the like.

The preparation method (II) is advantageous since the preparation system of the fluorine-containing elastomer particles (A4) can be used successively as it is. Even in the case of a surfactant being present in a polymerization reaction field, it can be used as it is in the preparation process of the present invention.

From the viewpoint of satisfactory polymerization efficiency and crosslinking efficiency, it is preferable to adjust the concentration of the fluorine-containing elastomer particles (A4) in the aqueous dispersion to be 5 to 50% by mass. The concentration is further preferably not less than 10% by mass; especially preferably not less than 20% by mass, and preferably not more than 40% by mass, especially preferably not more than 30% by mass.

The crosslinking reaction is initiated by carrying out cleavage of the peroxide (B) in the aqueous dispersion, thereby generating peroxy radicals.

In the case where the peroxide (B) is a thermal decomposition type compound, since the reaction is carried out in the aqueous dispersion, heating temperature is not less than 50° C. and not more than 100° C. at a normal pressure (1 atm), preferably not less than 60° C. and not more than 90° C. from the viewpoint of crosslinking efficiency.

A reaction time is usually 2 to 10 hours, further 3 to 6 hours.

The crosslinking reaction may be initiated by irradiation with active energy rays such as ultraviolet rays or radiation at normal temperature, and in that case, a crosslinking auxiliary, a sensitizer or the like may be contained in the dispersion.

In the preparation process of the present invention, the peroxide crosslinking reaction may be carried out together with the crosslinking reaction with active energy rays. An embodiment essentially necessitating crosslinking reaction with active energy rays, namely, the process for preparing the crosslinked fluorine-containing elastomer fine particles by irradiating the aqueous dispersion comprising the peroxide-crosslinkable fluorine-containing elastomer particles (A4) and the polyfunctional unsaturated compound (C) with active energy rays at normal temperature to subject the fluorine-containing elastomer particles (A4) to crosslinking with active energy rays is also one of suitable embodiments of the present invention.

After completion of the crosslinking reaction, the obtained crosslinked fluorine-containing elastomer fine particles can be separated and recovered by a method such as a freeze coagulation method, a salting-out method, an acid coagulation method or the like method. Among these, a freeze coagulation method is preferred from the viewpoint of satisfactory shape of particles after the coagulation.

The present invention also relates to the so-obtained crosslinked fluorine-containing elastomer fine particles (D4) subjected to peroxide crosslinking.

An average particle size of the crosslinked fluorine-containing elastomer fine particles (D4) remains substantially unchanged from the average particle size of the fluorine-containing elastomer particles (A4) since the crosslinking reaction proceeds inside the fluorine-containing elastomer particles (A4). Accordingly, the average particle size thereof is preferably 0.01 to 0.5 µm. The average particle size is further preferably not more than 0.4 µm, especially not more than 0.3 µm, and not less than 0.05 µm, especially not less than 0.1 µm.

The fluorine content of the crosslinked fluorine-containing elastomer fine particles (D4) varies depending on kind and amount of the polyfunctional unsaturated compound (C) to be used, and is preferably not less than 65% by mass, further preferably not less than 70% by mass, from the viewpoint of improvement in composite dispersibility with a fluorine-containing resin.

The degree of crosslinking of the crosslinked fluorine-containing elastomer fine particles (D4) may be adjusted depending on purpose of the use, and for example, in the case of the use as a material for automobiles, it is preferable that the amount of crosslinked fluorine-containing elastomer fine particles being insoluble in acetone is not less than 80% by mass, from the viewpoint of mechanical strength. The amount of particles being insoluble in acetone is further preferably not less than 90% by mass, and an upper limit is 100% by mass.

Such crosslinked fluorine-containing elastomer fine particles (D4) may be either in the form of powder or in the form of aqueous dispersion depending on application thereof.

The crosslinked fluorine-containing elastomer fine particles (D4) may be used alone or may be mixed with other material and used as a composition. The use thereof as a mixture together with other material is especially effective.

Example of other material is the synthetic resin (E). The synthetic resin (E) may be, for example, a curable resin, and from the viewpoint of making the best use of characteristics of the crosslinked fluorine-containing elastomer fine particles (D4) as an elastomer, a thermoplastic resin is preferred.

Examples of a thermoplastic resin are fluorine-containing resin, polyethylene, polypropylene, polyvinyl chloride, polyvinylidene chloride, polystyrene, polyvinyl acetate, acrylonitrile-butadiene-styrene resin, acrylic resin, polyamide, polyacetal, polycarbonate, polybutylene terephthalate, polyethylene terephthalate, polyphenylene sulfide, polysuiphone, polyether sulphone, polyether ether ketone, polyimide, and polyamide imide.

Examples of fluorine-containing resin are perfluoro copolymers such as tetrafluoroethylene (TFE)/perfluoro (alkyl vinyl ether) copolymer (PFA) and TFE/hexafluoropropylene (HFP) copolymer (FEP); TFE/ethylene copolymer (ETFE) and TFE/HFP/ethylene copolymer (EFEP), and these may be used depending on purpose and application.

The mixing ratio of the crosslinked fluorine-containing elastomer fine particles (D4) to the synthetic resin (E), especially a fluorine-containing resin is usually 95/5 to 5/95, further 80/20 to 20/80 in a mass ratio ((D4)/(E)) and may be optionally selected depending on kind, application and purpose of the use of each component.

The composition comprising the crosslinked fluorine-containing elastomer fine particles (D4) and the fluorine-containing resin exhibits excellent performance when used as a fuel hose, a dynamic sealing material and a soft resin.

When preparing a composition for a fuel hose, it is preferable to use FEP, PFA and ETFE as a fluorine-containing resin, and in this case, it is preferable to blend the crosslinked fluorine-containing elastomer fine particles (D4) in an amount of 95 to 5 parts by mass, further 70 to 20 parts by mass based on 100 parts by mass of the fluorine-containing resin from the viewpoint of satisfactory fuel barrier property.

When preparing a composition for a dynamic sealing material, it is preferable to use FEP, PFA and ETFE as a fluorine-containing resin, and in this case, it is preferable to blend the crosslinked fluorine-containing elastomer fine particles (D4) in an amount of 95 to 5 parts by mass, further 80 to 30 parts by mass based on 100 parts by mass of the fluorine-containing resin from the viewpoint of satisfactory rubber elasticity.

When preparing a composition for a soft resin, it is preferable to use FEP, PFA and ETFE as a fluorine-containing resin, and in this case, it is preferable to blend the crosslinked fluorine-containing elastomer fine particles (D4) in an amount of 95 to 5 parts by mass, further 90 to 20 parts by mass based on 100 parts by mass of the fluorine-containing resin from the viewpoint of satisfactory rubber elasticity.

The composition comprising the crosslinked fluorine-containing elastomer fine particles (D4) and the synthetic resin (E) may be prepared by a dry blend method using a mixer such as a banbury mixer or a rotary stirrer, or a homogeneous composition may be prepared by mixing an aqueous dispersion (aqueous dispersion after crosslinking) of the crosslinked fluorine-containing elastomer fine particles (D4) with an aqueous dispersion of the synthetic resin (E) fine particles and then co-coagulating the mixture.

In the present invention, especially in the field where neither high purity nor non-contaminating property is demanded, it is possible to blend usual additives, for example, filler, processing aid, plasticizer, coloring agent and the like which are blended to resin compositions according to necessity, and one or more usual crosslinking agent and crosslinking auxiliary may be blended.

EXAMPLE

The present invention is then explained by means of Examples, but the present invention is not limited to them
Measuring methods to be used in the present invention are as follows.
(1) Fluorine Content
Fluorine content is calculated from data determined by NMR analysis (JNM-EX270 available from JEOL Ltd.).
(2) Average Particle Size
An average particle size is calculated from data determined by observation with a transmission electron microscope.
(3) Test of Dissolution in Acetone
0.5 g of crosslinked elastomer particles is poured into 50 ml of acetone of 25° C., and after sufficiently stirring with a stirrer and allowing to stand at 25° C. for 48 hours, filtration is carried out (kiriyama filter paper) and a residue (insoluble particles) is dried. An amount of the residue insoluble in acetone is calculated from data obtained by measuring with a precise balance.
(4) Preparation of Sheet-Like Test Piece
The compositions prepared in Examples 5 to 16 and Comparative Examples 3 to 8 are set in a metal die, followed by holding at 290° C. for 15 to 30 minutes to make a dynamically crosslinked composition in a molten state. After that, a load of 3 MPa is applied thereto for one minute for compression molding, and thus, sheet-like test pieces having a specific thickness specified in each test are prepared.

(5) Measurement of Tensile Strength at Break, Tensile Elongation at Break and Tensile Modulus of Elasticity
A 2 mm thick sheet-like test piece is prepared by the method described in (4) above and is punched into a test piece in the form of dumbbell having a bench mark distance of 3.18 mm by using ASTM V dumbbell. With respect to the obtained test piece in the form of dumbbell, tensile strength at break, tensile elongation at break and tensile modulus of elasticity are measured at 25° C. at 50 mm/min according to ASTM D638 using an autograph (AGS-J 5kN available from Shimadzu Corporation).
(6) Fuel Permeability
A 0.5 mm thick sheet-like test piece is prepared by the method described in (4) above. Into a 20 ml SUS stainless steel vessel (area of opening $1.26 \times 10^{-3}$ m$^2$) is poured 18 ml of a dummy fuel CE10 (toluene/isooctane/ethanol=45/45/10 in volume percent), and the sheet-like test piece is set at the opening portion of the vessel, and the opening is tightly closed to make a test sample. The test sample is put in a thermostatic chamber (60° C.) and a weight of the test sample is measured. When a weight reduction per unit time becomes constant, fuel permeation coefficient is determined by the following equation.

$$\text{Fuel permeation coefficient } ((g \cdot mm)/(m^2 \cdot day)) = \frac{[\text{Weight reduction (g)}] \times [\text{Thickness of sheet (mm)}]}{[\text{Area of opening } 1.26 \times 10^{-3} \text{ (m}^2\text{)}] \times [\text{Measuring interval (day)}]}$$

Preparation Example 1

(Preparation of Fluorine-Containing Elastomer Fine Particles A-1)
Into a 3,000 ml pressure resistant reactor were poured 1,500 ml of pure water and 7.5 g of ammonium perfluorooctanoate, and after replacing the inside of the reactor with a gas mixture of TFE/VdF/HFP (molar ratio of 11/19/70), the inside pressure was increased to 1.47 MPaG (15 kgf/cm$^2$G), 0.3 ml (25° C.) of I(CF$_2$CF$_2$)$_2$I was introduced, the inside temperature was increased to 80° C. with stirring, and 10 ml of 0.2% aqueous solution of APS was introduced under pressure. After about 0.5-hour induction period had passed, decrease in pressure occurred, and when the inside pressure decreased to 1.27 MPaG (13 kgf/cm$^2$G), it was increased again to 1.47 MPaG (15 kgf/cm$^2$G) with a gas mixture of TFE/VdF/HFP (molar ratio of 20/50/30). Thereafter, polymerization was continued within a pressure range from 1.27 to 1.47 MPaG (13 to 15 kgf/cm$^2$G) in the same manner as above. Twenty hours after, the inside temperature was rapidly decreased and pressure release was carried out to terminate the polymerization.
The concentration of the fluorine-containing elastomer fine particles A-1 in the prepared aqueous dispersion was 25% by mass, the average particle size thereof was 0.2 μm, and the fluorine content thereof was 71% by mass. The number of terminal iodine atoms was two.

Preparation Example 2

(Preparation of Fluorine-Containing Elastomer Fine Particles A-2)
Into a 3,000 ml pressure resistant reactor were poured 1,500 ml of pure water and 7.5 g of ammonium perfluorooctanoate, and after replacing the inside of the reactor with a gas mixture of VdF/HFP (molar ratio of 45/55), the inside pressure was increased to 1.47 MPaG (15 kgf/cm$^2$G), 0.3 ml (25° C.) of I(CF$_2$CF$_2$)$_2$I was introduced, the inside temperature was increased to 80° C. with stirring, and 10 ml of 0.2% aqueous solution of APS was introduced under pressure. After about 0.5-hour induction period had passed, decrease in pressure occurred, and when the inside pressure decreased to 1.27 MPaG (13 kgf/cm$^2$G), it was increased again to 1.47 MPaG (15 kgf/cm$^2$G) with a gas mixture of VdF/HFP (molar ratio of 78/22). Thereafter, polymerization was continued within a pressure range from 1.27 to 1.47 MPaG (13 to 15 kgf/cm$^2$G) in the same manner as above. Twenty hours after, the inside temperature was rapidly decreased and pressure release was carried out to terminate the polymerization.

The concentration of the fluorine-containing elastomer fine particles A-2 in the prepared aqueous dispersion was 25% by mass, the average particle size thereof was 0.2 μm, and the fluorine content thereof was 66% by mass. The number of terminal iodine atoms was two.

Example 1

The inside of the polymerization vessel containing the aqueous dispersion (concentration of fluorine-containing elastomer fine particles: 25% by mass) of the fluorine-containing elastomer fine particles A-1 just after the polymerization (average particle size: 0.2 μm, fluorine content: 71% by mass) was replaced with nitrogen gas, and then was heated up to 80° C.

To this aqueous dispersion (fluorine-containing elastomer fine particles: 25 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-1 was 0.2 μm, the fluorine content thereof was 71% by mass, and the amount of particles being insoluble in acetone was 85% by mass.

Example 2

The inside of the polymerization vessel containing the aqueous dispersion (concentration of fluorine-containing elastomer fine particles: 25% by mass) of the fluorine-containing elastomer fine particles A-2 just after the polymerization (average particle size: 0.2 μm, fluorine content: 66% by mass) was replaced with nitrogen gas, and then was heated up to 80° C.

To this aqueous dispersion (fluorine-containing elastomer fine particles: 25 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-2 was 0.2 μm, the fluorine content thereof was 66% by mass, and the amount of particles being insoluble in acetone was 85% by mass.

Example 3

The inside of the polymerization vessel containing the aqueous dispersion (concentration of fluorine-containing elastomer fine particles: 25% by mass) of the fluorine-containing elastomer fine particles A-1 just after the polymerization (average particle size: 0.2 μm, fluorine content: 71% by mass) was replaced with nitrogen gas, and then was heated up to 80° C.

To this aqueous dispersion (fluorine-containing elastomer fine particles: 25 parts by mass) was added 3 parts by mass of triallyl isocyanurate (TAIC), followed by 45-minute stirring. Then, 1.14 parts by mass of PERBUTYL O was added thereto to initiate crosslinking reaction. After 5-hour reaction with stirring, the mixture was cooled to room temperature to terminate the reaction, and an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-3 was 0.2 μm, the fluorine content thereof was 71% by mass, and the amount of particles being insoluble in acetone was 100% by mass.

Example 4

The inside of the polymerization vessel containing the aqueous dispersion (concentration of fluorine-containing elastomer fine particles: 25% by mass) of the fluorine-containing elastomer fine particles A-2 just after the polymerization (average particle size: 0.2 μm, fluorine content: 66% by mass) was replaced with nitrogen gas, and then was heated up to 80° C.

To this aqueous dispersion (fluorine-containing elastomer fine particles: 25 parts by mass) was added 3 parts by mass of triallyl isocyanurate (TAIC), followed by 45-minute stirring. Then, 1.14 parts by mass of PERBUTYL O was added thereto to initiate crosslinking reaction. After 5-hour reaction with stirring, the mixture was cooled to room temperature to terminate the reaction, and an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-4 was 0.2 μm, the fluorine content thereof was 66% by mass, and the amount of particles being insoluble in acetone was 100% by mass.

Comparative Example 1

(Crosslinking During Polymerization)

Into a 3,000 ml pressure resistant reactor were poured 1,500 ml of pure water and 7.5 g of ammonium perfluorooctanoate, and after replacing the inside of the reactor with a gas mixture of TFE/VdF/HFP (molar ratio of 11/19/70), the inside pressure was increased to 1.47 MPaG (15 kgf/cm$^2$G), 0.3 ml (25° C.) of I(CF$_2$CF$_2$)$_2$I was introduced, the inside temperature was increased to 80° C. with stirring, and 10 ml of 0.2% aqueous solution of APS was introduced under pressure. After about 0.5-hour induction period had passed, decrease in pressure occurred, and when the inside pressure decreased to 1.27 MPaG (13 kgf/cm$^2$G), while increasing it again to 1.47 MPaG (15 kgf/cm$^2$G) with a gas mixture of TFE/VdF/HFP (molar ratio of 20/50/30), 1,4-butanediol divinyl ether was added with a micro pump in an amount of 3.5% by mole based on the total number of moles of the introduced gas mixture of TFE/VdF/HFP. Thereafter, polymerization was continued within a pressure range from 1.27 to 1.47 MPaG (13 to 15 kgf/cm$^2$G) in the same manner as above. Twenty hours after, the inside temperature was rapidly decreased and pressure release was carried out to terminate the polymerization.

The average particle size of the obtained crosslinked fluorine-containing elastomer fine particles X-1 was 0.2 µm, the fluorine content thereof was 71% by mass, and the amount of particles being insoluble in acetone was 75% by mass.

Comparative Example 2

(Crosslinking During Polymerization)

Into a 3,000 ml pressure resistant reactor were poured 1,500 ml of pure water and 7.5 g of ammonium perfluorooctanoate, and after replacing the inside of the reactor with a gas mixture of VdF/HFP (molar ratio of 45/55), the inside pressure was increased to 1.47 MPaG (15 kgf/cm$^2$G), 0.3 ml (25° C.) of I(CF$_2$CF$_2$)$_2$I was introduced, the inside temperature was increased to 80° C. with stirring, and 10 ml of 0.2% aqueous solution of APS was introduced under pressure. After about 0.5-hour induction period had passed, decrease in pressure occurred, and when the inside pressure decreased to 1.27 MPaG (13 kgf/cm$^2$G), while increasing it again to 1.47 MPaG (15 kgf/cm$^2$G) with a gas mixture of VdF/HFP (molar ratio of 78/22), 1,4-butanediol divinyl ether was added with a micro pump in an amount of 3.5% by mole based on the totAl number of moles of the introduced gas mixture of VdF/HFP. Thereafter, polymerization was continued within a pressure range from 1.27 to 1.47 MPaG (13 to 15 kgf/cm$^2$G) in the same manner as above. Twenty hours after, the inside temperature was rapidly decreased and pressure release was carried out to terminate the polymerization.

The average particle size of the obtained crosslinked fluorine-containing elastomer fine particles X-2 was 0.2 µm, the fluorine content thereof was 66% by mass, and the amount of particles being insoluble in acetone was 75% by mass.

Example 5

A composition was prepared by kneading 30 parts by mass of a powder of the crosslinked fluorine-containing elastomer fine particles D-1 obtained in Example 1 and 70 parts by mass of pellets of a tetrafluoroethylene/ethylene copolymer (ETFE) with LABOPLASTOMIL (LABOPLASTOMIL 655 available from TOYO SEIKI KABUSHIKI KAISHA).

Examples 6 to 8

Compositions were prepared in the same manner as in Example 5 except that the crosslinked fluorine-containing elastomer fine particles D-2, D-3 and D-4 obtained in Examples 2, 3 and 4, respectively were used instead of the crosslinked fluorine-containing elastomer fine particles D-1.

Example 9

22 parts by mass of the aqueous dispersion (solid content: 25% by mass) of the crosslinked fluorine-containing elastomer fine particles D-1 obtained in Example 1 was mixed with 78 parts by mass of the aqueous dispersion of tetrafluoroethylene/hexafluoropropylene copolymer (FEP) (average particle size of FEP particles: 0.2 µm, solid content: 16% by mass), followed by stirring at 80° C. for 30 minutes. Then, the mixture was brought to room temperature, and after freeze-coagulation at −20° C. for 24 hours, filtration and drying were carried out to obtain a composition in the form of powder comprising the crosslinked fluorine-containing elastomer fine particles D-1 and FEP.

Examples 10 to 12

Compositions were prepared in the same manner as in Example 9 except that the aqueous dispersions of the crosslinked fluorine-containing elastomer fine particles D-2, D-3 and D-4 obtained in Examples 2, 3 and 4, respectively were used instead of the aqueous dispersion of the crosslinked fluorine-containing elastomer fine particles D-1.

Example 13

A composition was prepared by kneading 50 parts by mass of a powder of the crosslinked fluorine-containing elastomer fine particles D-1 obtained in Example 1 and 50 parts by mass of pellets of FEP with LABOPLASTOMIL (LABOPLASTOMIL 655 available from TOYO SEIKI KABUSHIKI KAISHA).

Examples 14 to 16

Compositions were prepared in the same manner as in Example 13 except that the crosslinked fluorine-containing elastomer fine particles D-2, D-3 and D-4 obtained in Examples 2, 3 and 4, respectively were used instead of the crosslinked fluorine-containing elastomer fine particles D-1.

Comparative Examples 3 and 4

Compositions were prepared in the same manner as in Example 5 except that the crosslinked fluorine-containing elastomer fine particles X-1 obtained in Comparative Example 1 was used instead of the crosslinked fluorine-containing elastomer fine particles D-1 (Comparative Example 3) and the crosslinked fluorine-containing elastomer fine particles X-2 obtained in Comparative Example 2 was used instead of the crosslinked fluorine-containing elastomer fine particles D-1 (Comparative Example 4).

Comparative Examples 5 and 6

Compositions were prepared in the same manner as in Example 9 except that the crosslinked fluorine-containing elastomer fine particles X-1 obtained in Comparative Example 1 was used instead of the crosslinked fluorine-containing elastomer fine particles D-1 (Comparative Example 5) and the crosslinked fluorine-containing elastomer fine particles X-2 obtained in Comparative Example 2 was used instead of the crosslinked fluorine-containing elastomer fine particles D-1 (Comparative Example 6).

Comparative Examples 7 and 8

Compositions were prepared in the same manner as in Example 13 except that the crosslinked fluorine-containing elastomer fine particles X-1 obtained in Comparative Example 1 was used instead of the crosslinked fluorine-containing elastomer fine particles D-1 (Comparative Example 7) and the crosslinked fluorine-containing elastomer fine particles X-2 obtained in Comparative Example 2 was used instead of the crosslinked fluorine-containing elastomer fine particles D-1 (Comparative Example 8).

Test Example 1

Mechanical properties of the compositions obtained in Examples 5 to 16 and Comparative Examples 3 to 8 were examined. The results are shown in Table 1.

Test Example 2

Fuel (gasoline) permeability of the compositions obtained in Examples 5 to 16 and Comparative Examples 3 to 8 was examined. The results are shown in Table 1.

TABLE 1

| | Composition | | |
|---|---|---|---|
| | Crosslinked fluorine-containing elastomer fine particles | Fluorine-containing resin | Mixing method |
| Ex. 5 | D-1 | ETFE | kneading |
| Ex. 6 | D-2 | ETFE | kneading |
| Ex. 7 | D-3 | ETFE | kneading |
| Ex. 8 | D-4 | ETFE | kneading |
| Ex. 9 | D-1 | FEP | co-coagulation |
| Ex. 10 | D-2 | FEP | co-coagulation |
| Ex. 11 | D-3 | FEP | co-coagulation |
| Ex. 12 | D-4 | FEP | co-coagulation |
| Ex. 13 | D-1 | FEP | kneading |
| Ex. 14 | D-2 | FEP | kneading |
| Ex. 15 | D-3 | FEP | kneading |
| Ex. 16 | D-4 | FEP | kneading |
| Com. Ex. 3 | X-1 | ETFE | kneading |
| Com. Ex. 4 | X-2 | ETFE | kneading |
| Com. Ex. 5 | X-1 | FEP | co-coagulation |
| Com. Ex. 6 | X-2 | FEP | co-coagulation |
| Com. Ex. 7 | X-1 | FEP | kneading |
| Com. Ex. 8 | X-2 | FEP | kneading |

| | Mechanical properties | | | |
|---|---|---|---|---|
| | Strength (MPa) | Elongation (%) | Elastic modulus (MPa) | Fuel (gasoline) permeability (g · mm/m$^2$ · day) |
| Ex. 5 | 22 | 499 | 259 | 4.6 |
| Ex. 6 | 15 | 468 | 186 | 6.1 |
| Ex. 7 | 25 | 514 | 263 | 4.1 |
| Ex. 8 | 18 | 499 | 189 | 5.9 |
| Ex. 9 | 14 | 300 | 310 | 0.68 |
| Ex. 10 | 10 | 298 | 258 | 1.2 |
| Ex. 11 | 17 | 331 | 311 | 0.64 |
| Ex. 12 | 13 | 309 | 261 | 0.94 |
| Ex. 13 | 8 | 50 | 305 | 0.72 |
| Ex. 14 | 6 | 92 | 261 | 1.3 |
| Ex. 15 | 10 | 120 | 309 | 0.71 |
| Ex. 16 | 8 | 119 | 260 | 1.0 |
| Com. Ex. 3 | 18 | 398 | 276 | 10.1 |
| Com. Ex. 4 | 11 | 359 | 199 | 11.9 |
| Com. Ex. 5 | 10 | 211 | 337 | 5.1 |
| Com. Ex. 6 | 6 | 188 | 287 | 5.6 |
| Com. Ex. 7 | 4 | 43 | 329 | 5.5 |
| Com. Ex. 8 | 3 | 69 | 280 | 6.1 |

Preparation Example 3

(Preparation of Fluorine-Containing Elastomer Fine Particles A-3)

Into a 6,000 ml pressure resistant reactor were poured 2 liters of pure water, 20 g of ammonium perfluorooctanoate $C_7F_{15}COONH_4$ as an emulsifier and 0.18 g of disodium hydrogenphosphate.12H$_2$O as a pH regulating agent, and after the inside of a system was sufficiently replaced with nitrogen gas, the reactor was heated up to 50° C. with stirring at 600 rpm and tetrafluoroethylene (TFE) and perfluoro(methyl vinyl ether) (PMVE) were introduced in a molar ratio of 24/76 to give the inside pressure of 1.18 MPaG (12.0 kgf/cm$^2$G). Then, 2 ml of an aqueous solution containing 186 mg/ml of ammonium persulfate (APS) was introduced with pressurized nitrogen gas to initiate a reaction. As the polymerization reaction proceeded, the inside pressure decreased, and when the inside pressure decreased to 1.08 MPaG (11.0 kgf/cm$^2$G), 4.0 g of a chain transfer agent, i.e., a diiodine compound $I(CF_2)_4I$ was introduced and then 20.0 g of TFE was introduced at its self-pressure and 22.0 g of PMVE was introduced with a plunger pump, thus repeating increase and decrease in the inside pressure. Every time when the total amount of the introduced TFE and PMVE reached 430 g, 511 g, 596 g and 697 g, 1.5 g of an iodine compound $ICH_2CF_2CF_2OCF=CF_2$ was introduced, and after the initiation of the reaction, 2 ml of an aqueous solution containing 35 mg/ml of APS was introduced with pressurized nitrogen gas every 12 hours. Thus, the reaction was continued. When the total amount of the introduced TFE and PMVE reached 860 g thirty-five hours after initiating the polymerization reaction, the inside temperature was rapidly decreased and pressure release was carried out to terminate the polymerization, and 2 liters of pure water was added.

The concentration of the fluorine-containing elastomer fine particles A-3 in the prepared aqueous dispersion was 22% by mass, the average particle size thereof was 0.1 μm, and the fluorine content thereof was 76% by mass. The number of terminal iodine atoms was four.

Example 17

(Preparation of Crosslinked Fluorine-Containing Elastomer Fine Particles D-5)

The inside of the polymerization reactor containing the aqueous dispersion (concentration of fluorine-containing elastomer fine particles: 22% by mass) of the fluorine-containing elastomer fine particles A-3 just after the polymerization (average particle size: 0.1 μm, fluorine content: 76% by mass) was replaced with nitrogen gas, and then was heated up to 80° C.

To this aqueous dispersion (amount of fluorine-containing elastomer fine particles A-3: 22 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-5 was 0.1 μm, the fluorine content thereof was 76% by mass, and the amount of particles being insoluble in acetone was 97% by mass.

Example 18

(Resin Composition Comprising FEP)

15.4 parts by mass of the aqueous dispersion (solid content: 22% by mass) of the crosslinked fluorine-containing elastomer fine particles D-5 prepared in Example 17 was mixed with 84.6 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-5 and FEP (D-5/FEP=20/80 in mass ratio).

Example 19

(Resin Composition Comprising FEP)

23.8 parts by mass of the aqueous dispersion (solid content: 22% by mass) of the crosslinked fluorine-containing elastomer fine particles D-5 prepared in Example 17 was mixed with 76.2 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-5 and FEP (D-5/FEP=30/70 in mass ratio).

Preparation Example 4

(Preparation of Fluorine-Containing Elastomer Fine Particles A-4)

Into a 3,000 ml pressure resistant reactor were poured 1,500 ml of pure water and 2 g of ammonium perfluorooctanoate $C_7F_{15}COONH_4$, and after the inside of a system was sufficiently replaced with a gas mixture of VdF/HFP/TFE (18/71/11 in molar ratio), the inside pressure was increased to 1.57 MPaG (16 kgf/cm²G), the inside temperature was increased to 80° C. and 10 ml of a 0.3% aqueous solution of ammonium persulfate (APS) was introduced under pressure with stirring. Since the inside pressure was decreased as the polymerization reaction proceeded, when the inside pressure decreased to 1.47 MPaG (15 kgf/cm²G), a chain transfer agent, i.e., a diiodine compound $I(CF_2)_4I$ (1.3 g) was introduced, and when the inside pressure further decreased to 1.37 MPaG (14 kgf/cm²G), it was again increased to 1.57 MPaG (16 kgf/cm²G) with a gas mixture of VdF/HFP/TFE (50/20/30 in molar ratio). Thereafter, the polymerization was continued within a pressure range from 1.37 MPaG (14 kgf/cm²G) to 1.57 MPaG (16 kgf/cm²G) in the same manner as above.

When the total pressure drop reached 0.49 MPaG (5 kgf/cm²G) after the initiation of the polymerization reaction, 1.8 g of an iodine compound $CF_2=CFOCF_2CF_2CH_2I$ was introduced. Then, the polymerization reaction was continued in the same manner as above within a pressure range from 1.37 MPaG (14 kgf/cm²G) to 1.57 MPaG (16 kgf/cm²G). When the decreased amount of the gas mixture in a gas cylinder reached 400 g, the inside temperature was rapidly decreased and pressure release was carried out to terminate the polymerization.

The concentration of the fluorine-containing elastomer fine particles A-4 in the prepared aqueous dispersion was 25% by mass, the average particle size thereof was 0.2 μm, and the fluorine content thereof was 71% by mass. The number of terminal iodine atoms was six.

Example 20

(Preparation of Crosslinked Fluorine-Containing Elastomer Fine Particles D-6)

The inside of the polymerization reactor containing the aqueous dispersion of the fluorine-containing elastomer fine particles A-4 (concentration of fluorine-containing elastomer fine particles: 25% by mass) just after the polymerization (average particle size: 0.2 μm., fluorine content: 71% by mass) was replaced with nitrogen gas, and then was heated up to 80° C.

To this aqueous dispersion (fluorine-containing elastomer fine particles: 25 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-6 was 0.2 μm, the fluorine content thereof was 71% by mass, and the amount of particles being insoluble in acetone was 87% by mass.

Example 21

(Resin Composition Comprising FEP)

15.3 parts by mass of the aqueous dispersion (solid content: 25% by mass) of the crosslinked fluorine-containing elastomer fine particles D-6 prepared in Example 20 was mixed with 84.7 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-6 and FEP (D-6/FEP=20/80 in mass ratio).

Example 22

(Resin Composition Comprising FEP)

15.3 parts by mass of the aqueous dispersion (solid content: 25% by mass) of the crosslinked fluorine-containing elastomer fine particles D-1 prepared in Example 1 was mixed with 84.7 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-1 and FEP (D-1/FEP=20/80 in mass ratio).

Comparative Example 9

(FEP Alone)

The aqueous dispersion of tetrafluoroethylene/hexafluoropropylene copolymer (FEP) (average particle size of FEP particles: 0.2 μm, solid content: 16% by mass) used in the above-mentioned Examples and Comparative Examples was stirred at 80° C. for 30 minutes. Then, the dispersion was brought to room temperature and after 24-hour freeze-coagulation at −20° C., filtration and drying were carried out to obtain FEP in the form of powder.

Test Example 3

With respect to the compositions obtained in Examples 18, 19, 21 and 22 and FEP powder of Comparative Example 9, mechanical properties and fuel (gasoline) permeability thereof were examined. The results are shown in Table 2.

TABLE 2

| | Composition | | Mechanical properties | | | Fuel (gasoline) |
|---|---|---|---|---|---|---|
| | Crosslinked fluorine-containing elastomer fine particles (part by mass) | Fluorine-containing resin (part by mass) | Strength (MPa) | Elongation (%) | Elastic modulus (MPa) | permeability (g · mm/day · m²) |
| Ex. 18 | D-5 (20) | FEP (80) | 28.3 | 325 | 404 | 0.083 |
| Ex. 19 | D-5 (30) | FEP (70) | 23.9 | 256 | 320 | 0.393 |
| Ex. 21 | D-6 (20) | FEP (80) | 24.9 | 362 | 416 | 0.199 |
| Ex. 22 | D-1 (20) | FEP (80) | 19.7 | 313 | 453 | 0.400 |
| Com. Ex. 9 | Nil | FEP (100) | 23.9 | 446 | 592 | 0.500 |

Preparation Example 5

(Preparation of Fluorine-Containing Elastomer Fine Particles A-5)

Into a 6,000 ml pressure resistant reactor were poured 2 liters of pure water, 20 g of ammonium perfluorooctanoate $C_7F_{15}COONH_4$ as an emulsifier and 0.18 g of disodium hydrogenphosphate.12$H_{20}$ as a pH regulating agent, and after the inside of a system was sufficiently replaced with nitrogen gas, the inside temperature was increased to 50° C. with stirring at 600 rpm and pressurized tetrafluoroethylene (TFE) and perfluoro(methyl vinyl ether) (PMVE) in a molar ratio of 24/76 were introduced to give the inside pressure of 1.18 MPaG (12.0 kgf/cm²G). Then, 2 ml of an aqueous solution containing 186 mg/ml of ammonium persulfate (APS) was introduced with pressurized nitrogen gas to initiate a reaction. As the polymerization reaction proceeded, the inside pressure decreased, and when the inside pressure decreased to 1.08 MPaG (11.0 kgf/cm²G), 4.0 g of a chain transfer agent, i.e., a diiodine compound I(CF$_2$)$_4$I was introduced and then 20.0 g of TFE was introduced at its self-pressure and 22.0 g of PMVE was introduced with a plunger pump, thus repeating increase and decrease in the inside pressure. Every time when the total amount of the introduced TFE and PMVE reached 430 g, 511 g, 596 g and 697 g, 1.5 g of an iodine compound ICH$_2$CF$_2$CF$_2$OCF=CF$_2$ was introduced and after the initiation of the reaction, 2 ml of an aqueous solution of 35 mg/ml of APS was introduced with pressurized nitrogen gas every 12 hours. Thus, the reaction was continued. When the total amount of the introduced TFE and PMVE reached 860 g thirty-five hours after initiating the polymerization reaction, the inside temperature was decreased rapidly and pressure release was carried out to terminate the polymerization, and 2 liters of pure water was added.

The concentration of the fluorine-containing elastomer fine particles A-5 in the prepared aqueous dispersion was 29% by mass, the average particle size thereof was 0.1 μm, and the fluorine content thereof was 76% by mass. The number of terminal iodine atoms was four.

Preparation Example 6

(Preparation of Fluorine-Containing Elastomer Fine Particles A-6)

Into a 3,000 ml pressure resistant reactor were poured 1,500 ml of pure water and 2 g of ammonium perfluorooctanoate $C_7F_{15}COONH_4$, and after the inside of a system was sufficiently replaced with a gas mixture of VdF/HFP/TFE (18/71/11 in molar ratio), the inside pressure was increased to 1.57 MPaG (16 kgf/cm²G), the inside temperature was increased to 80° C. and 10 ml of a 0.3% aqueous solution of ammonium persulfate (APS) was introduced under pressure with stirring. Since the inside pressure was decreased as the polymerization reaction proceeded, when the inside pressure decreased to 1.47 MPaG (15 kgf/cm²G), a chain transfer agent, i.e., a diiodine compound I(CF$_2$)$_4$I (1.3 g) was introduced, and when the inside pressure further decreased to 1.37 MPaG (14 kgf/cm²G), it was again increased to 1.57 MPaG (16 kgf/cm²G) with a gas mixture of VdF/HFP/TFE (50/20/30 in molar ratio). Thereafter, the polymerization was continued within a pressure range from 1.37 MPaG (14 kgf/cm²G) to 1.57 MPaG (16 kgf/cm²G) in the same manner as above.

When the total pressure drop reached 0.49 MPaG (5 kgf/cm²G) after the initiation of the polymerization reaction, 1.8 g of an iodine compound CF$_2$=CFOCF$_2$CF$_2$CH$_2$I was introduced. Then, the polymerization was continued in the same manner as above within a pressure range from 1.37 MPaG (14 kgf/cm²G) to 1.57 MPaG (16 kgf/cm²G). When the decreased amount of the gas mixture in a gas cylinder reached 400 g, the inside temperature was decreased rapidly and pressure release was carried out to terminate the polymerization.

The concentration of the fluorine-containing elastomer fine particles A-6 in the prepared aqueous dispersion was 23% by mass, the average particle size thereof was 0.2 μm, and the fluorine content thereof was 71% by mass. The number of terminal iodine atoms was six.

Preparation Example 7

(Preparation of Fluorine-Containing Elastomer Fine Particles A-7)

Into a 3,000 ml pressure resistant reactor were poured 1,500 ml of pure water and 7.5 g of ammonium perfluorooctanoate, and after replacing the inside of the reactor with a gas mixture of TFE/VdF/HFP (molar ratio of 11/19/70), the inside pressure was increased to 1.47 MPaG (15 kgf/cm²G), 0.3 ml (25° C.) of I(CF$_2$CF$_2$)$_2$I was introduced, the inside temperature was increased to 80° C. with stirring, and 10 ml of 0.2% aqueous solution of APS was introduced under pressure. After about 0.5 hour induction period had passed, decrease in pressure occurred, and when the inside pressure decreased to 1.27 MPaG (13 kgf/cm²G), it was increased again to 1.47 MPaG (15 kgf/cm²G) with a gas mixture of TFE/VdF/HFP (molar ratio of 20/50/30). Thereafter, polymerization was continued within a pressure range from 1.27 to 1.47 MPaG (13 to 15 kgf/cm²G) in the same manner as above. Twenty hours after, the inside temperature was decreased rapidly and pressure release was carried out to terminate the polymerization.

The concentration of the fluorine-containing elastomer fine particles A-7 in the prepared aqueous dispersion was 23% by mass, the average particle size thereof was 0.2 μm, and the fluorine content thereof was 71% by mass. The number of terminal iodine atoms was two.

Example 23

(Preparation of Crosslinked Fluorine-Containing Elastomer Fine Particles D-7)

The inside of the polymerization reactor containing the aqueous dispersion (concentration of fluorine-containing elastomer fine particles: 29% by mass) of the fluorine-containing elastomer fine particles A-5 just after the polymerization (average particle size: 0.1 μm, fluorine content: 76% by mass) was replaced with nitrogen gas, and then was heated up to 80° C.

To this aqueous dispersion (amount of fluorine-containing elastomer fine particles A-5: 29 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and thus an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power. The average particle size of the obtained crosslinked fluorine-containing elastomer fine particles D-7 was 0.1 μm, the fluorine content thereof was 76% by mass, and the amount of particles being insoluble in acetone was 97% by mass.

Example 24

(Preparation of Crosslinked Fluorine-Containing Elastomer Fine Particles D-8)

The inside of the polymerization reactor containing the aqueous dispersion (concentration of fluorine-containing elastomer fine particles: 23% by mass) of the fluorine-containing elastomer fine particles A-6 just after the polymerization (average particle size: 0.2 μm, fluorine content: 71% by mass) was replaced with nitrogen gas, and then was heated up to 80° C.

To this aqueous dispersion (fluorine-containing elastomer fine particles: 23 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and thus an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-8 was 0.2 μm, the fluorine content thereof was 71% by mass, and the amount of particles being insoluble in acetone was 87% by mass.

Example 25

(Preparation of Crosslinked Fluorine-Containing Elastomer Fine Particles D-9)

The inside of the polymerization reactor containing the aqueous dispersion (concentration of fluorine-containing elastomer fine particles: 23% by mass) of the fluorine-containing elastomer fine particles A-7 just after the polymerization (average particle size: 0.2 μm, fluorine content: 71% by mass) was replaced with nitrogen gas, and then was heated up to 80° C.

To this aqueous dispersion (fluorine-containing elastomer fine particles: 23 parts by mass) was added 3 parts by mass of triallyl isocyanurate (TAIC), followed by 45-minute stirring. Then, 1.14 parts by mass of ammonium persulfate (APS) was added thereto to initiate crosslinking reaction. After 5-hour reaction with stirring, the mixture was cooled to room temperature to terminate the reaction, and thus an aqueous dispersion of crosslinked fluorine-containing elastomer fine particles was obtained. A part of the dispersion was subjected to freeze-coagulation at −20° C. for 24 hours, followed by filtration and drying to recover crosslinked fluorine-containing elastomer fine particles in the form of power.

The average particle size of the obtained crosslinked fluorine-containing elastomer fine particles D-9 was 0.2 gym, the fluorine content thereof was 71% by mass, and the amount of particles being insoluble in acetone was 85% by mass.

Example 26

(Resin Composition Comprising FEP)

1.7 parts by mass of an aqueous dispersion (solid content: 29% by mass) of the crosslinked fluorine-containing elastomer fine particles D-7 prepared in Example 23 was mixed with 247.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-7 and FEP (D-7/FEP=1/99 in mass ratio).

Example 27

(Resin Composition Comprising FEP)

8.6 parts by mass of an aqueous dispersion (solid content: 29% by mass) of the crosslinked fluorine-containing elastomer fine particles D-7 prepared in Example 23 was mixed with 237.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-7 and FEP (D-7/FEP=5/95 in mass ratio).

Example 28

(Resin Composition Comprising FEP)

17.2 parts by mass of an aqueous dispersion (solid content: 29% by mass) of the crosslinked fluorine-containing elastomer fine particles D-7 prepared in Example 23 was mixed with 225.0 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-7 and FEP (D-7/FEP=10/90 in mass ratio).

Example 29

(Resin Composition Comprising FEP)

25.9 parts by mass of an aqueous dispersion (solid content: 29% by mass) of the crosslinked fluorine-containing elastomer fine particles D-7 prepared in Example 23 was mixed with 212.5 parts by mass of an aqueous dispersion of tetrafluoroethylene/hexafluoropropylene copolymer (FEP) (average particle size of FEP particles: 0.2 μm, solid content: 16% .by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-7 and FEP (D-7/FEP=15/85 in mass ratio).

Example 30

(Resin Composition Comprising FEP)

10.9 parts by mass of an aqueous dispersion (solid content: 23% by mass) of the crosslinked fluorine-containing elastomer fine particles D-8 prepared in Example 24 was mixed with 237.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-8 and FEP (D-8/FEP=5/95 in mass ratio).

Example 31

(Resin Composition Comprising FEP)

21.7 parts by mass of an aqueous dispersion (solid content: 23% by mass) of the crosslinked fluorine-containing elastomer fine particles D-8 prepared in Example 24 was mixed with 225.0 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-8 and FEP (D-8/FEP=10/90 in mass ratio).

Example 32

(Resin Composition Comprising FEP)

32.6 parts by mass of an aqueous dispersion (solid content: 23% by mass) of the crosslinked fluorine-containing elastomer fine particles D-8 prepared in Example 24 was mixed with 212.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-8 and FEP (D-8/FEP=15/85 in mass ratio).

Example 33

(Resin Composition Comprising FEP)

2.2 parts by mass of an aqueous dispersion (solid content: 23% by mass) of the crosslinked fluorine-containing elastomer fine particles D-9 prepared in Example 25 was mixed with 247.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-9 and FEP (D-9/FEP=1/99 in mass ratio).

Example 34

(Resin Composition Comprising FEP)

10.9 parts by mass of an aqueous dispersion (solid content: 23% by mass) of the crosslinked fluorine-containing elastomer fine particles D-9 prepared in Example 25 was mixed with 237.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-9 and FEP (D-9/FEP=5/95 in mass ratio).

Example 35

(Resin Composition Comprising FEP)

21.7 parts by mass of an aqueous dispersion (solid content: 23% by mass) of the crosslinked fluorine-containing elastomer fine particles D-9 prepared in Example 25 was mixed with 225.0 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-9 and FEP (D-9/FEP=10/90 in mass ratio).

Example 36

(Resin Composition Comprising FEP)

32.6 parts by mass of an aqueous dispersion (solid content: 23% by mass) of the crosslinked fluorine-containing elastomer fine particles D-9 prepared in Example 25 was mixed with 212.5 parts by mass of an aqueous dispersion of tetrafluoroethylene/hexafluoropropylene copolymer (FEP) (average particle size of FEP particles: 0.2 μm, solid content: 16% by mass), and the mixture was stirred at 80° C. for 30 minutes. Then, the mixture was brought to room temperature and after 24-hour freeze-coagulation at −20° C., filtration and drying were carried out to obtain a composition in the form of powder comprising the crosslinked fluorine-containing elastomer fine particles D-9 and FEP (D-9/FEP=15/85 in mass ratio).

Test Example 4

With respect to the compositions obtained in Examples 26 to 36 and the FEP powder of Comparative Example 9, mechanical properties and fuel (gasoline) permeability were examined. The results are shown in Table 3.

TABLE 3

| | Composition | | Mechanical properties | | | |
|---|---|---|---|---|---|---|
| | Crosslinked fluorine-containing elastomer fine particles (part by mass) | Fluorine-containing resin (part by mass) | Strength (MPa) | Elongation (%) | Elastic modulus (MPa) | Fuel (gasoline) permeability (g · mm/day · m²) |
| Ex. 26 | D-7 (1) | FEP (99) | 26.9 | 440 | 592 | 0.101 |
| Ex. 27 | D-7 (5) | FEP (95) | 26.1 | 437 | 506 | 0.103 |
| Ex. 28 | D-7 (10) | FEP (90) | 27.2 | 337 | 420 | 0.062 |
| Ex. 29 | D-7 (15) | FEP (85) | 27.3 | 328 | 410 | 0.070 |
| Ex. 30 | D-8 (5) | FEP (95) | 25.6 | 437 | 523 | 0.236 |
| Ex. 31 | D-8 (10) | FEP (90) | 25.9 | 417 | 485 | 0.178 |
| Ex. 32 | D-8 (15) | FEP (85) | 24.9 | 410 | 433 | 0.187 |
| Ex. 33 | D-9 (1) | FEP (99) | 24.9 | 440 | 592 | 0.201 |
| Ex. 34 | D-9 (5) | FEP (95) | 24.1 | 438 | 591 | 0.183 |
| Ex. 35 | D-9 (10) | FEP (90) | 22.2 | 426 | 540 | 0.142 |
| Ex. 36 | D-9 (15) | FEP (85) | 21.3 | 412 | 461 | 0.201 |
| Com. Ex. 9 | Nil | FEP (100) | 23.9 | 446 | 592 | 0.500 |

INDUSTRIAL APPLICABILITY

In the present invention, according to the composition of the first invention comprising the crosslinked fluorine-containing elastomer fine particles (D1) and the synthetic resin (E), fuel impermeability of the resin itself can be remarkably improved in addition to improvement in moldability and mechanical properties such as low elastic modulus and flexibility of the synthetic resin.

According to the crosslinked fluorine-containing elastomer fine particles (D2) of the second invention, an effect of enabling improvement in a gel fraction and crosslinking density of the crosslinked fluorine-containing elastomer fine particles can be exhibited.

According to the composition of the third invention comprising the crosslinked fluorine-containing elastomer fine particles (D2) and the synthetic resin (E), fuel impermeability of the resin itself can be remarkably improved in addition to improvement in moldability and mechanical properties such as low elastic modulus and flexibility of the synthetic resin.

According to the crosslinked fluorine-containing elastomer fine particles (D3) of the fourth invention, an effect of enabling improvement in a gel fraction and crosslinking density of the crosslinked fluorine-containing elastomer fine particles can be exhibited.

According to the composition of the fifth invention comprising the crosslinked fluorine-containing elastomer fine particles (D3) and the synthetic resin (E), fuel impermeability of the resin itself can be remarkably improved in addition to improvement in moldability and mechanical properties such as low elastic modulus and flexibility of the synthetic resin.

According to the preparation process of the sixth invention, crosslinked fluorine-containing elastomer fine particles can be finely dispersed in the resin and flexibility can be imparted without impairing physical properties of the resin.

Namely, crosslinking is not carried out during polymerization, which is advantageous in that the polymerization is not inhibited by a crosslinkable monomer and crosslinked fluorine-containing elastomer fine particles having a high molecular weight and high strength can be prepared, and further, crosslinking is not carried out after separation (coagulation), which is advantageous in that crosslinked fluorine-containing elastomer fine particles maintaining a form of primary particle can be obtained.

According to the crosslinked fluorine-containing elastomer fine particles (D4) of the seventh invention subjected to peroxide crosslinking, an effect of obtaining crosslinked fluorine-containing elastomer fine particles maintaining a form of primary particle can be exhibited since crosslinking is not carried out after separation (coagulation).

The invention claimed is:

1. Crosslinked fluorine-containing elastomer fine particles (D3) obtained by crosslinking particles (A3) of a fluorine-containing elastomer (a3) comprising a structural unit derived from an ethylenically unsaturated monomer comprising at least one fluoroolefin and a structural unit derived from a monomer represented by the formula (3c):

$$CY^1_2 = CY^2 R_f^1 X^1 \quad (3c)$$

wherein $Y^1$ and $Y^2$ are fluorine atom, hydrogen atom or —$CH_3$; $R_f^1$ is a linear or branched fluoroalkylene or perfluoroalkylene group which may have an ether linkage-formable oxygen atom; $X^1$ is iodine atom or bromine atom; and wherein an average particle size of the crosslinked fluorine-containing elastomer fine particles (D3) is from 0.01 to 0.5 μm.

2. The crosslinked fluorine-containing elastomer fine particles of claim 1, wherein a fluorine content of the fluorine-containing elastomer (a3) constituting said crosslinked fluorine-containing elastomer fine particles (D3) is not less than 65% by mass.

3. The crosslinked fluorine-containing elastomer fine particles of claim 1, wherein the fluorine-containing elastomer (a3) constituting said crosslinked fluorine-containing elastomer fine particles (D3) comprises a structural unit derived from at least one monomer selected from the group consisting of tetrafluoroethylene, vinylidene fluoride and a perfluoro ethylenically unsaturated compound represented by the formula (1):

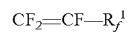 (1)

wherein $R_f^1$ is —$CF_3$ or —$OR_f^2$, where $R_f^2$ is a perfluoroalkyl group having 1 to 5 carbon atoms.

4. The crosslinked fluorine-containing elastomer fine particles of claim 1, wherein an average particle size of said crosslinked fluorine-containing elastomer fine particles (D3) is from 0.3 to 0.1 μm.

5. A composition comprising the crosslinked fluorine-containing elastomer fine particles (D3) of claim 1 and a synthetic resin (E).

6. The composition of claim 5, wherein said synthetic resin (E) is a tetrafluoroethylene-hexafluoropropylene copolymer.

* * * * *